US 6,637,538 B2

(12) United States Patent  (10) Patent No.: US 6,637,538 B2
Morykon et al.  (45) Date of Patent: Oct. 28, 2003

(54) EASY MOUNT CONNECTOR

(75) Inventors: Peter M. Morykon, Fort Wayne, IN (US); William Dennis Mann, Roanoke, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/876,493

(22) Filed: Jun. 8, 2001

(65) Prior Publication Data

US 2002/0185327 A1 Dec. 12, 2002

(51) Int. Cl.[7] .............................................. B60K 26/00
(52) U.S. Cl. ..................... 180/313; 285/140.1; 439/562
(58) Field of Search ......................... 285/136.1, 139.1, 285/139.3, 140.1, 197; 439/549, 551, 552, 553, 555, 562, 564, 573; 174/21 JS, 19, 21 R, 22 C; 403/315, 316, 317, 318, 319; 180/313

(56) References Cited

U.S. PATENT DOCUMENTS

| 2,078,453 | A | * | 4/1937 | Miller ..................... 285/140.1 |
| 3,850,495 | A | * | 11/1974 | Glover ....................... 439/273 |
| 4,405,196 | A | * | 9/1983 | Fulton ........................ 439/551 |
| 4,650,223 | A | * | 3/1987 | Miyazaki et al. ......... 285/139.1 |
| 5,411,114 | A | * | 5/1995 | Bedi et al. .................... 184/1.5 |
| 5,769,661 | A | * | 6/1998 | Nealis ........................ 439/551 |
| 6,045,163 | A | * | 4/2000 | Moffitt .................... 285/139.1 |
| 6,300,572 | B1 | * | 10/2001 | McKay ..................... 174/74 R |

FOREIGN PATENT DOCUMENTS

DE  4233167  *  4/1994

* cited by examiner

Primary Examiner—Brian L. Johnson
Assistant Examiner—Bryan Fischmann
(74) Attorney, Agent, or Firm—Jeffrey P. Calfa; Neil T. Powell; Dennis Kelly Sullivan

(57) ABSTRACT

A connector component for fluidly or electrically connecting two or more devices to one another is constructed in such a manner that it can be repeatedly quickly and easily mounted to and subsequently separated from a connector mounting component. The connector component includes a mounting portion that is disposed within a connector opening in the connector mounting component when the connector component is mounted to the connector mounting component. The connector component includes at least one quick connect clip such as an E-clip or snap ring clip that can be engaged to the connector component to maintain its attachment to the connector mounting component.

30 Claims, 32 Drawing Sheets

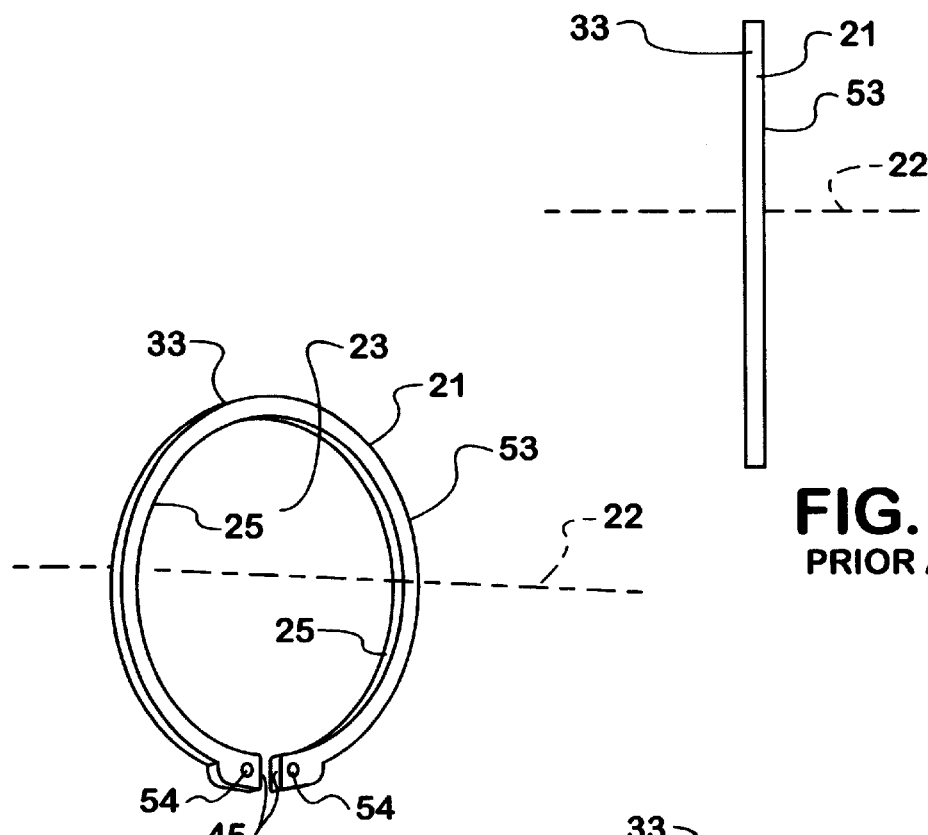
FIG. 8b
PRIOR ART
FIG. 8a
PRIOR ART
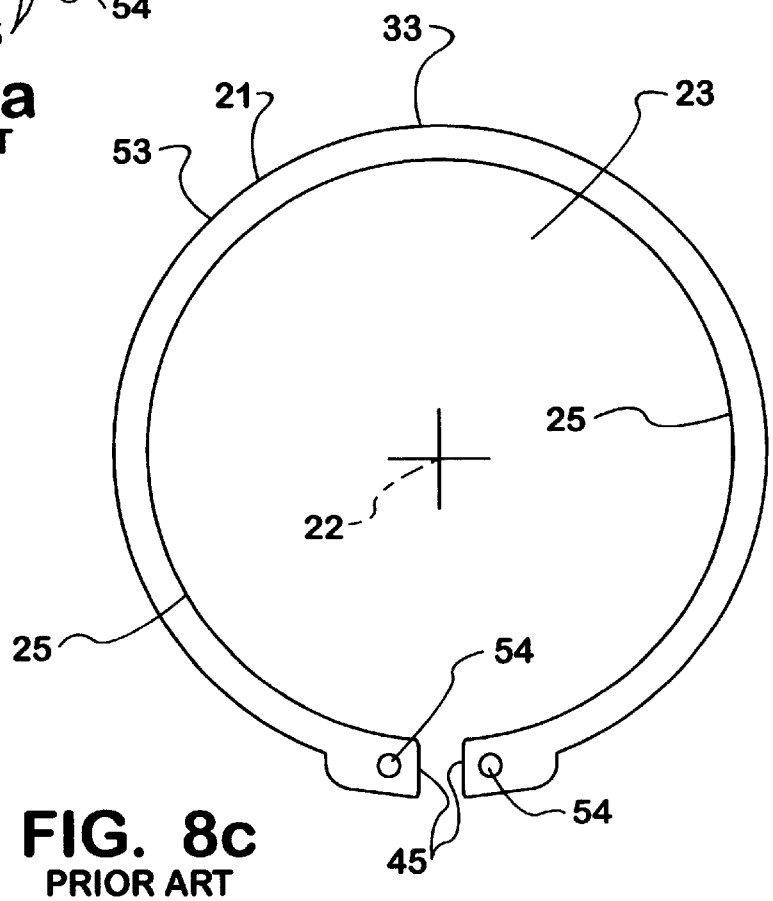
FIG. 8c
PRIOR ART

//EASY MOUNT CONNECTOR

BACKGROUND OF THE INVENTION

This invention relates to connector components that fluidly or electrically connect two or more devices to one another and that are mounted to a connector mounting component. More specifically, the connector components that the present invention relates to are of a type that are generally mounted to a connector mounting component with a connector body of the connector component disposed within a connector opening defined through the connector mounting component. An example of a prior art connector component of this type is illustrated in FIG. 3. Many such connector components are of a design that makes the process of securing the connector component to a connector mounting component relatively labor intensive. The prior art connector component shown in FIG. 3 is an example of a connector component for which the process of securing the connector component to the connector mounting component is relatively labor intensive. The connector component shown in FIG. 3 has a mounting rib defined by the connector body of the connector component and disposed upon one side of the connector mounting component to which the connector component is mounted. The connector component shown in FIG. 3 further includes a mounting nut that is threadedly engaged to the connector body of the connector component and is disposed upon a side of the connector mounting component opposite the mounting rib. The connector component shown in FIG. 3 is secured to the connector mounting component as a result of a portion of the connector mounting component, adjacent the connector mounting opening, being disposed between the mounting rib and the mounting nut. The process of threading the mounting nut onto the connector body of the connector component shown in FIG. 3 is a relatively labor intensive process.

SUMMARY OF INVENTION

As a result, an object of the present invention is to provide a connector component which is constructed in a manner allowing for relatively easy mounting of the connector component to a connector mounting component.

The connector component of the present invention has a connector body. The connector body of the connector component of the present invention comprises a mounting portion. The mounting portion of the connector body of the connector component has a shape such that it will fit within a connector opening defined through a connector mounting component. The mounting portion also has a length such that it may be disposed within the connector opening with a first end of the mounting portion and a second end of the mounting portion disposed upon opposite sides of the connector mounting component. When the connector component is properly mounted to the connector mounting component the mounting portion of the connector body protrudes through the connector opening in the connector mounting component. The connector component of the present invention further includes first retention structure and second retention structure that maintain proper engagement of the connector component to the connector mounting component. The connector component of the present invention also defines a fluid communication passageway or comprises electricity conducting structure, which may be connected to two or more devices for fluidly or electrically connecting various ones of the two or more devices to one another.

As mentioned above, the first retention structure and the second retention structure of the connector component have the purpose of maintaining proper engagement of the connector component to a connector mounting component. The first retention structure and the connector body are constructed in such a manner that the first retention structure may be engaged to the connector body adjacent a first end of the mounting portion of the connector body. The second retention structure and the connector body are constructed in such a manner that the second retention structure may be engaged to the connector body adjacent a second end of the mounting portion of the connector body. The construction of the first retention structure, the second retention structure, and the connector body are such that, when properly engaged to the connector body, the first retention structure and the second retention structure extend outwardly from the connector body in directions perpendicular to a central axis of the mounting portion of the connector body. Thus, when the connector component is properly mounted to a connector mounting component, movement of the connector body in directions parallel to the central axis of the mounting portion of the connector body eventually causes abutment between a portion of the connector mounting component adjacent the connector opening and either the first retention structure or the second retention structure. Thus, when the mounting portion of the connector body is disposed within the connector opening of a connector mounting component and the first retention structure and the second retention structure are properly engaged to the connector body, the mounting portion of the connector body is prevented from moving out of the connector opening.

The connector component of the present invention is constructed in such a manner that it may be repeatedly mounted to and subsequently separated from a connector mounting component. The connector body, the first retention structure, and the second retention structure are constructed such that the first retention structure and/or the second retention structure may be repeatedly engaged to and disengaged from the connector body of the connector component. The connector body of the connector component defines one or more pilot portions adjacent a first end and/or a second end of the mounting portion of the connector body. Each such pilot portion of the connector body is of a shape and size such that it can be inserted through the connector opening defined through the connector mounting component that the connector component is to be mounted to. The first retention structure and/or the second retention structure of the connector component comprise(s) a quick connect clip that may be engaged to the connector body adjacent an end of the mounting portion of the connector body adjacent which a pilot portion is disposed. Such a quick connect clip comprises a clip body that extends at least 180 degrees around a clip central axis. The clip body of the one or more quick connect clip(s) of the first retention structure and/or the second retention structure of the connector component is spaced from the clip central axis along substantially its entire extent such that a clip opening is defined inwardly of the clip body. The connector body of the connector component defines one or more retention structure slot(s) that extend inwardly of outer surfaces of the connector body. The connector body defines such retention structure slots adjacent ends of the mounting portion adjacent to which, a pilot portion is disposed, and a quick connect clip of the first retention structure and/or the second retention structure may be engaged. The connector body and each of the quick connect clips of the first retention structure and/or the second retention structure are constructed in such a manner that each quick connect clip can be engaged to the connector body with at least a portion of an inner perimeter of its clip body disposed within one or more of the retention structure slots defined by the connector body. At least a portion of the retention structure slot(s), to which a particular quick connect clip may be engaged, extend in directions generally perpendicular to the central axis of the mounting portion of the connector body. The connector component and each quick connect clip is constructed such that, once the quick connect clip is properly engaged to the connector body with at least a portion of an inner perimeter of its clip body disposed within one or more retention structure slot(s), the quick connect clip must be elastically deformed in order to disengage it from the connector body. The construction of the connector body and each quick connect clip is also such that each quick connect clip can be repeatedly and rapidly slid or snapped into or out of proper engagement with the connector body.

Such a construction of a connector component allows an individual to rapidly and easily mount the connector component to or separate the connector component from a connector mounting component. With a quick connect clip of the first retention structure and/or the second retention structure of the connector component disengaged from a portion of, the connector body adjacent a pilot portion, the pilot portion of the connector body may be inserted through the connector opening defined through a connector mounting component. After the pilot portion is inserted through the connector opening, the mounting portion may be slid into the connector opening defined by the connector mounting component to a point such that the first end of the mounting portion and the second end of the mounting portion are disposed upon opposite sides of the connector mounting component. Once the mounting portion of the connector body is so disposed within the connector opening, the connector body may be secured to the connector mounting component by engaging to the connector body any of the first retention structure and the second retention structure that were not previously engaged to the connector body. Engagement of any of the first retention structure and the second retention structure that are quick connect clips to the connector body may be quickly and easily accomplished by sliding or snapping the quick connect clip(s) into engagement with one or more retention structure slot(s) defined by the connector body. In order to subsequently separate the connector component of the present invention from the connector mounting component a quick connect clip of the first retention structure and/or the second retention structure that is engaged to the connector body adjacent a pilot portion may be disengaged from the connector body of the connector component. Disengagement of such a quick connect clip of the first retention structure or the second retention structure from the connector body may be quickly and easily accomplished by sliding or snapping the quick connect clip out of engagement with one or more retention structure slot(s) defined by the connector body. Once the first retention structure and/or the second retention structure are disengaged from a portion of the connector body adjacent a pilot portion, the mounting portion and the adjacent pilot portion of the connector body may be withdrawn from the connector opening defined by the connector mounting component. Thus, it can be seen that the above mentioned object of the present invention as well as others not mentioned have been met.

DRAWINGS

Other objects and advantages of the invention will become more apparent upon perusal of the detailed description thereof and upon inspection of the drawings in which:

FIG. 8a is a perspective view of a snap ring clip that may be utilized as retention structure of the connector component of the present invention.

FIG. 8b is a side view of a snap ring clip that may be utilized as retention structure of the connector component of the present invention.

FIG. 8c is a front view of a snap ring clip that may be utilized as retention structure of the connector component of the present invention.

DETAILS OF INVENTION

Figure 1:
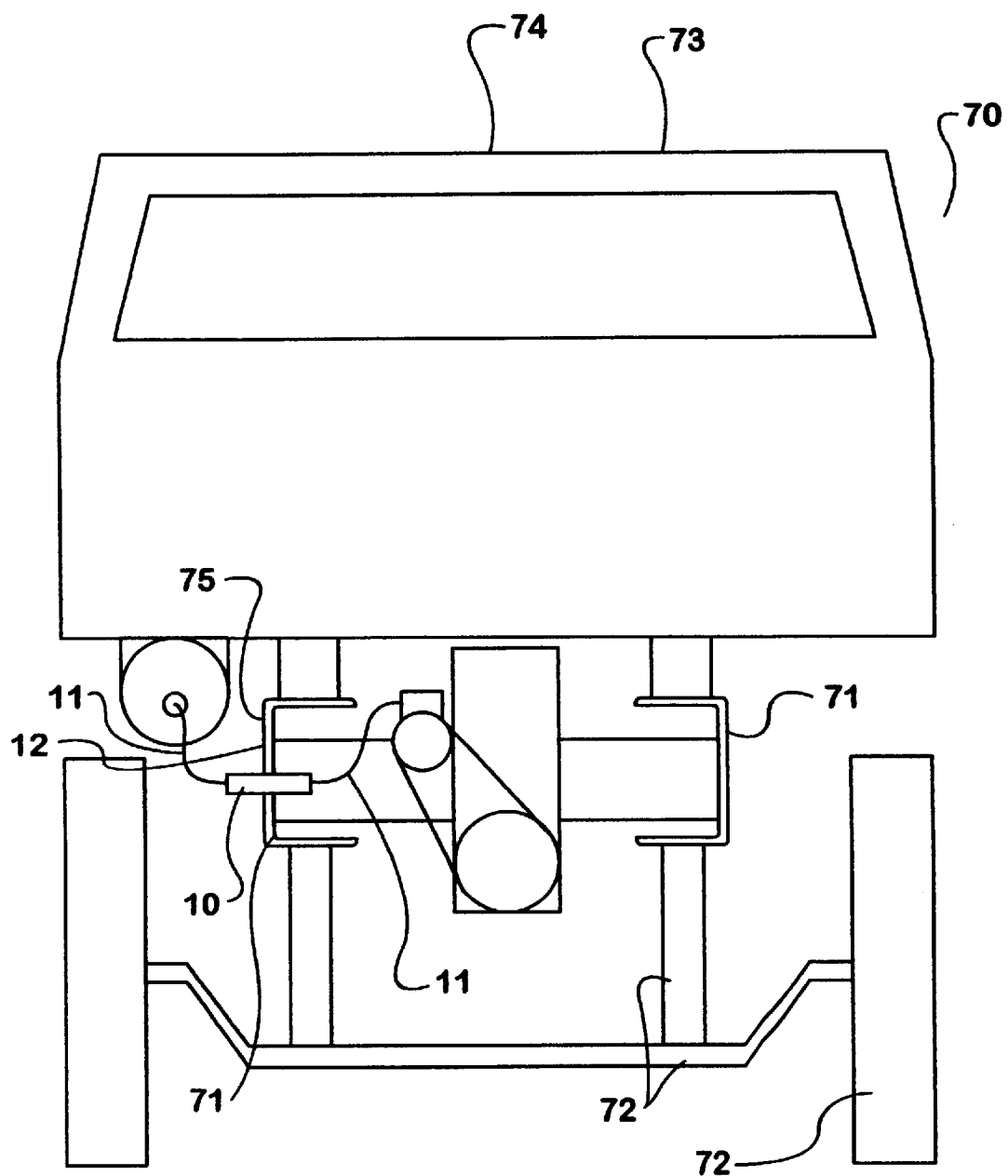
FIG. 1 is a front view of a vehicle that includes a connector component according to the present invention.

There is shown in the figures embodiments of a connector component 10 according to the present invention. The connector component 10 of the present invention is constructed to fluidly or electrically connect two or more device(s) 11 to one another. The connector component 10 of the present invention is also constructed to be mounted to and derive support from a connector mounting component 12. The connector component 10 of the present invention is also constructed in such a manner that it can be repeatedly mounted to and subsequently separated from the connector mounting component 12 in a relatively quick and easy manner.

The connector component 10 of the present invention may be constructed to fluidly connect two or more device(s) 11 to one another. The connector component 10 of the present invention comprises a connector body 13. The connector body 13 of a connector component 10 according to the present invention that is constructed to fluidly connect two or more devices 11 to one another defines a first opening 55 in its outer surfaces and also a second opening 56 in its outer surfaces. Such a connector body 13 also defines a fluid communication passageway 26 that is in fluid communication with and extends between the first opening 55 in the outer surfaces of the connector body 13 and the second opening 56 in the outer surfaces of the connector body 13. Such a connector component also includes structure to enable connecting two or more devices 11 to the connector body 13 in such a manner that a device 11 is in fluid communication with each of the first opening 55 and the second opening 56 in the outer surfaces of the connector body 13. A device 11 that is in fluid communication with an opening 55, 56 in the outer surfaces of the connector body 13 has a passageway or chamber of the device 11 in fluid communication with the opening 55, 56 in the outer surfaces of the connector body 13. Thus, device 11 that it is in fluid communication with the first opening 55 in the outer surfaces of the connector body 13 is in fluid communication, through the fluid communication passageway 26 defined through the connector body 13, with a device 11 that is in fluid communication with the second opening 56 in the outer surfaces of the connector body 13.

The devices 11 that are to be fluidly connected to one another by the connector component 10 and the structure of the connector component 10 that enables connection of these devices 11 to the connector component 10 may have any of an innumerable variety of well known designs. The devices 11 that are to be fluidly connected by the connector component may 10 be virtually any device 11 that includes a passageway or chamber within which a fluid may be disposed or flow. Examples of such devices 11 include, but are not limited to, tubing, pipe, fittings, couplers, reservoirs, manifolds, and assemblies that include some combination of these types of structures. The structure of the connector component 10 that enables engagement of devices 11 to the connector body 13 in such a manner that the devices 11 are in fluid communication with one of the openings 55, 56 in the outer surfaces of the connector body 13 may have any of an innumerable variety of well known designs. A connector body 13 may be constructed with threads so that a device 11 may be threadedly engaged to the connector body 13 of the connector component 10 in such a manner that it is in fluid communication with one of the openings 55, 56 defined in outer surfaces of the connector body 13. The connector component 10 may include any of a number of well known push-to-connect or quick connect types of coupling structure to which a device 11 may be engaged in such a manner that the device 11 would be in fluid communication with one of the openings 55, 56 in the outer surfaces of the connector body 13. A device 11 may be engaged to the connector component 10 by fasteners or clips in any of a number of well known ways such that the device 11 is in fluid communication with one of the openings 55, 56 defined in the outer surfaces of the connector body 13. Sealing of the interface between a device 11 and an opening 55, 56 with which the device 11 is in fluid communication may be accomplished in any of a number of well known ways. For exemplary purposes, there is shown in various ones of the figures, such as FIG. 2, a connector component 10 to which devices 11 that are tubing are threadedly connected in such a manner that a section of tubing is in fluid communication with each of the openings 55, 56 defined in the outer surfaces of the connector body 13.

Figure 13:
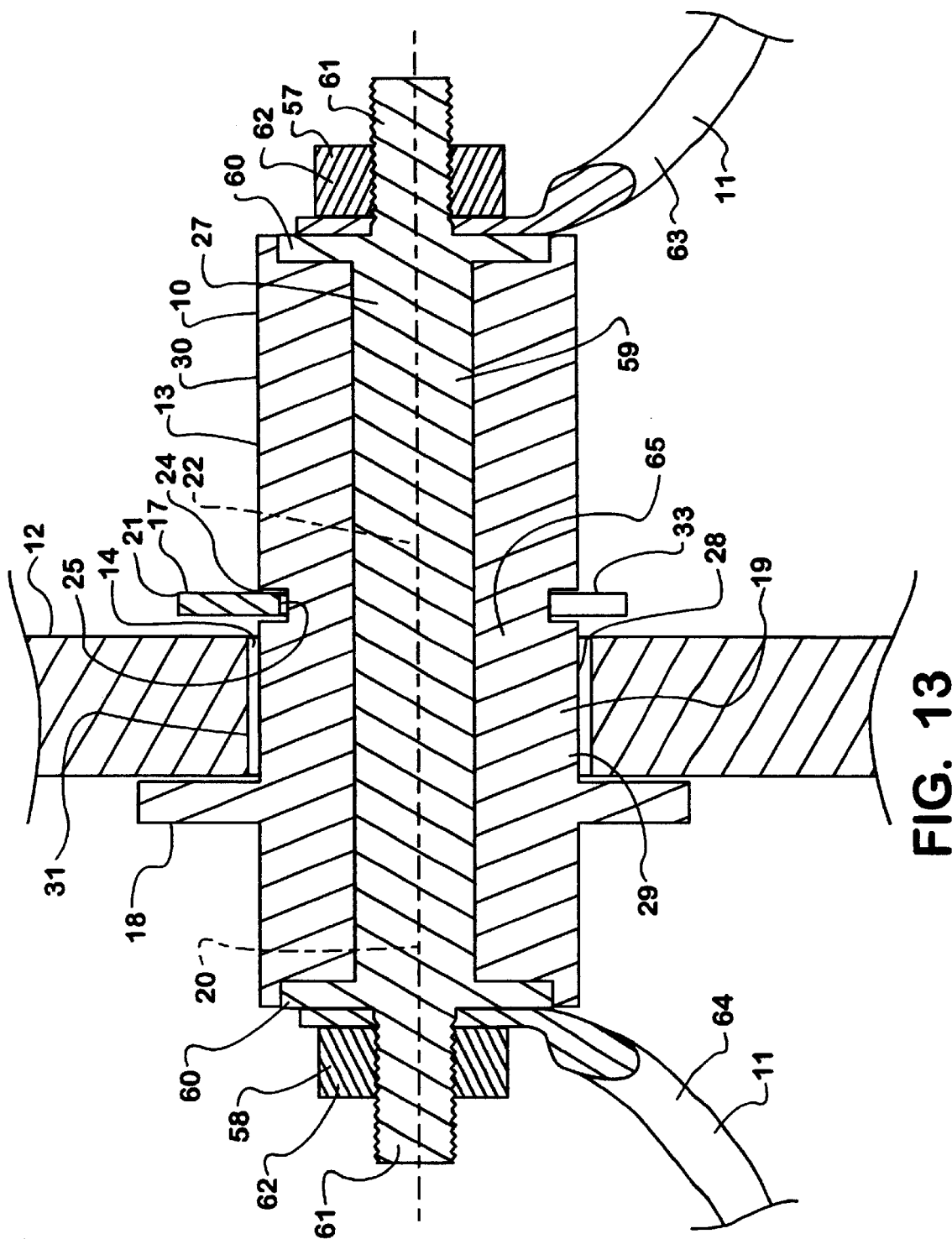
FIG. 13 is a sectional view of a connector component according to the present invention that electrically connects two devices to one another.

The connector component 10 of the present invention may be constructed to electrically connect two or more devices 11 to one another in addition to or instead of being constructed to fluidly connect two or more devices 11 to one another. A connector component 10 of the present invention that is constructed to electrically connect two or more devices 11 to one another would include first electrical connection structure 57 and second electrical connection structure 58 to either of which one or more devices 11 may be electrically connected. Such a connector component 10 also includes electricity conducting structure 27 that extends between and is electrically connected to the first electrical connection structure 57 and the second electrical connection structure 58. Thus, when one device 11 is electrically connected to the first electrical connection structure 57 and another device 11 is electrically connected to the second electrical connection structure 58, the two devices 11 are electrically connected to one another through the electricity conducting structure 27 of such a connector component 10. As is shown in FIG. 13, such a connector component 10 may also include insulation material 65 that electrically isolates electricity conducting structure 27 of the connector component 10 from a connector mounting component 12, when the connector component 10 is mounted to the connector mounting component 12.

The first electrical connection structure 57, the second electrical connection structure 58, the electricity conducting structure 27 that extends between them, and the devices 11 that may be electrically connected to one another by these parts of the connector component 10 may be of many different constructions that are well known and/or easily imagined by one of ordinary skill in the art. FIG. 13 illustrates, for exemplary purposes, one possible embodiment of these parts of the connector component 10 and the devices 11 that it electrically connects. The electricity conducting structure 27 of the connector component 10 illustrated in FIG. 13 comprises an electricity conducting member 59 that extends through the connector body 13 of the connector component 10. The first electrical connection structure 57 of connector component 10 shown in FIG. 13 includes a radially outwardly extending shoulder 60 defined by the electricity conducting member 59. The first electrical connection structure 57 of the connector component 10 shown in FIG. 13 also includes a threaded shaft portion 61 of the electricity conducting member 59 that is disposed outwardly of the radially outwardly extending shoulder 60 defined by the electricity conducting member 59. The first electrical connection structure 57 of the connector component 10 shown in FIG. 13 also includes a nut 62 that is shown threadedly engaged to the threaded shaft portion 61 of the electricity conducting member 59 of the connector component 10. The device 11 that is shown electrically connected to the first electrical connection structure 57 in FIG. 13 is a first electrical cable 63, an end of which is shown sandwiched against the radially outwardly extending shoulder 60 of the first electrical connection structure 57, by the nut 62 of the first electrical connection structure 57. Thus, the first electrical cable 63 is shown electrically connected to the first electrical connection structure 57 of the connector component 10 in FIG. 13. FIG. 13 also shows a device 11 that is a second electrical cable 64, electrically connected to second electrical connection structure 58 that is constructed in essentially the same way as the first electrical connection structure 57 shown in FIG. 13. Thus, the first electrical cable 63, the second electrical cable 64, and the connector component 10 shown in FIG. 13 are constructed and engaged to one another in such a manner that the first electrical cable 63 and the second electrical cable 64 are electrically connected to one another through the electricity conducting structure 27 of the connector component 10. It will be understood that FIG. 13 exemplifies only one of innumerable possible constructions of a connector component 10 and devices 11 that are electrically connected to one another by the connector component 10.

The connector component 10 of the present invention is constructed to be mounted to a connector mounting component 12 with a mounting portion 19 disposed within and protruding through a connector opening 14 defined through the connector mounting component 12. In order that this is possible, the mounting portion 19 of the connector body 13 must be of such a size and shape that the mounting portion 19 will fit within the connector opening 14 defined through the connector mounting component 12. The mounting portion 19 of the connector body 13 is also of such a length that it may be disposed within the connector opening 14 with a first end 28 of the mounting portion 19 and a second end 29 of the mounting portion 19 disposed upon opposite sides of the connector mounting component 12. Additionally, the connector body 13 must have one or more pilot portion(s) 30 disposed adjacent the first end portion 28 of the mounting portion 19 of the connector body 13 and/or the second end portion 29 of the mounting portion 19 of the connector body 13. Each pilot portion 30 of the connector body 13 is of such a size and shape that it may be inserted through the connector opening 14 defined through the connector mounting component 12. Such a construction of the connector component 10 allows for insertion of the pilot portion 30 and subsequently the adjacent mounting portion 19 of the connector body 13 into the connector opening 14 defined through the connector mounting component 12. Many different constructions of a connector body 13 and a connector mounting component 12 according to these guidelines are easily imaginable by one of ordinary skill in the art and are encompassed by the present invention.

The connector component 10 of the present invention includes structure that can be utilized to maintain proper engagement of the connector body 13 to a connector mounting component 12. The connector component 10 of the present invention includes first retention structure 17 and second retention structure 18 that are or may be engaged to the connector body 13 of the connector component 10. The connector body 13 and the first retention structure 17 are constructed in a manner such that the first retention structure 17 is or may be engaged to the connector body 13 adjacent the first end 28 of the mounting portion 19 of the connector body 13. When the first retention structure 17 is properly engaged to the connector body 13 in such a manner, at least some portion of the first retention structure 17 extends to points farther from a central axis 20 of the mounting portion 19 of the connector body 13 than adjacent portions of the mounting portion 19. The connector body 13 and the second retention structure 18 are constructed in such a manner that the second retention structure 18 is or may be engaged to the connector body 13 adjacent the second end 29 of the mounting portion 19 of the connector body 13. When the second retention structure 18 is properly engaged to the connector body 13 in such a manner, at least some portion of the second retention structure 18 extends to points farther from a central axis 20 of the mounting portion 19 of the connector body 13 than adjacent portions of the mounting portion 19. When the connector component 10 is properly mounted to a connector mounting component 12 the mounting portion 19 of the connector body 13 is disposed within the connector opening 14 defined through the connector mounting component 12. Also, when the connector component 10 is properly mounted to the connector mounting component 12, the first retention structure 17 and the second retention structure 18 are engaged to the first end 28 and the second end 29 respectively of the mounting portion 19 and are disposed upon opposite sides of the connector mounting component 12. When the connector component 10 of the present invention is properly mounted to a connector mounting component 12, at least some portion of each of the first and second retention structures 17, 18 extends beyond an outer perimeter 31 of the connector opening 14 in directions perpendicular to the central axis 20 of the mounting portion 19. The construction of the connector component 10 is such that the first retention structure 17 and the second retention structure 18 extend beyond the outer perimeter 31 of the connector opening 14 in such a manner, regardless of how the connector body 13 is shifted within the connector opening. As a result, when the connector component 10 is properly mounted to the connector mounting component 12 in such a manner, relative sliding of the connector component 10 and the connector mounting component 12 in directions parallel to the central axis 20 of the mounting portion 19 is limited, Such motion between the components is limited in one direction by eventual abutment between the first retention structure 17 and the connector mounting component 12 and is limited in an opposite direction by eventual abutment between the second retention structure 18 and the connector mounting component 12. A person of ordinary skill in the art could easily imagine a multitude of ways in which the connector body 13, the connector mounting component 12, the first retention structure 17, and the second retention structure 18 could be constructed and engaged to one another that would result in such a functional relationship between the components.

Figure 3:
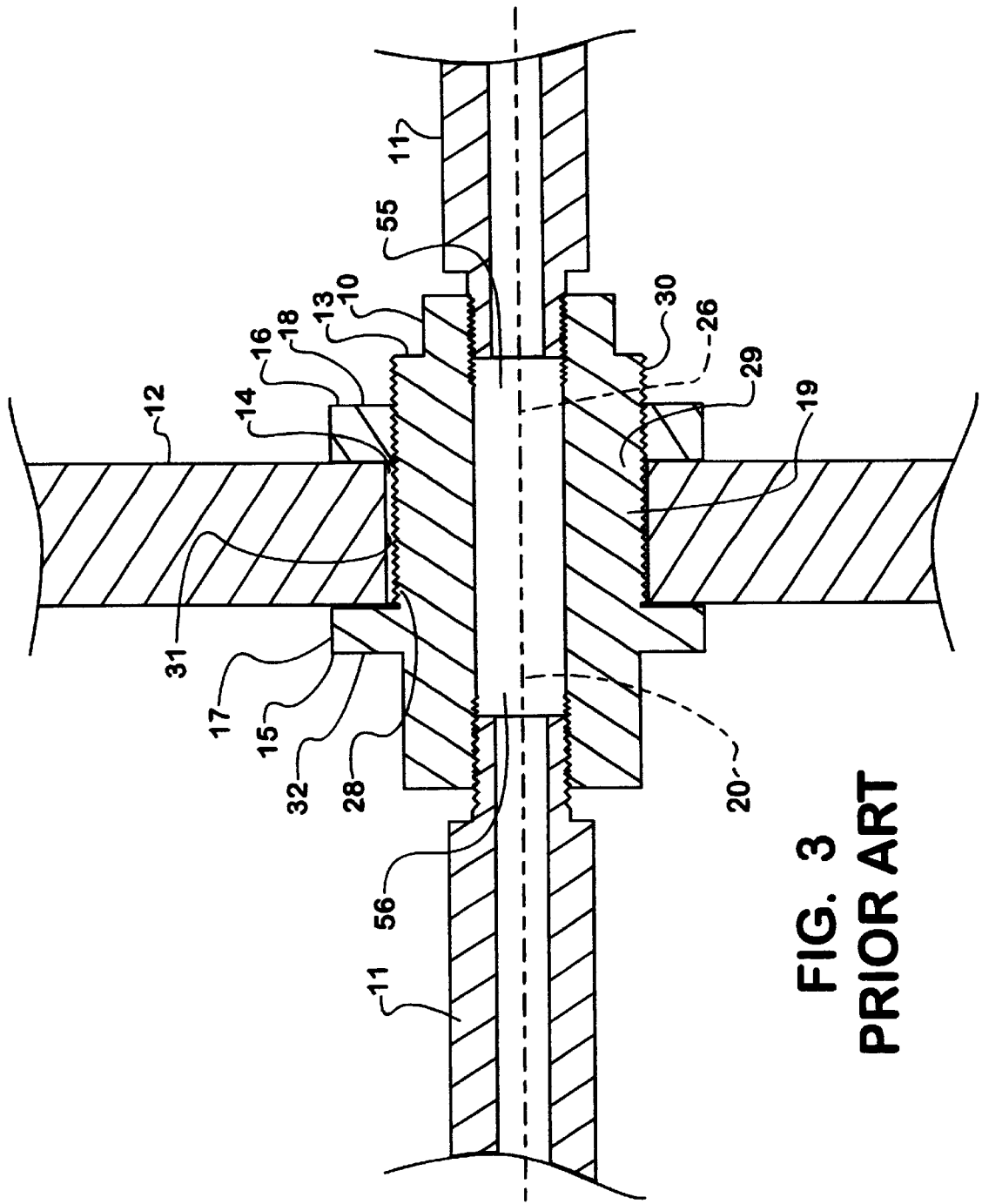
FIG. 3 is a sectional view of a prior art connector component similar to the connector component of the present invention.

The connector component 10 is constructed in a manner such that one or both of the first retention structure 17 and the second retention structure 18 may be repeatedly engaged to and subsequently disengaged from the connector body 13 of the connector component 10. The connector component 10 of the present invention is constructed in such a manner that at least one of the first retention structure 17 and the second retention structure 18 may be repeatedly engaged to and subsequently disengaged from a portion of the connector body 13 adjacent a pilot portion 30 of the connector body 13. When a connector component 10 of such a construction is mounted to a connector mounting component 12, and the first retention structure 17 and the second retention structure 18 are properly engaged to the connector body 13, it is assured that proper engagement of the connector component 10 to the connector mounting component 12 will be maintained. When a portion of the connector body 13 between an end 28, 29 of the mounting portion 19 and a pilot portion 30 has no retention structure 17, 18 engaged to it, the connector component 10 may be engaged to or disengaged from a connector mounting component 12. Such engagement of the connector component 10 to and disengagement of the connector component 10 from a connector mounting component 12 is accomplished by sliding of a pilot portion 30 and a mounting portion 19 into or out of the connector opening 14 defined through the connector mounting component 12. Thus, a connector component 10 with retention structure 17, 18 which may be repeatedly engaged to and subsequently disengaged from a portion of the connector body 13 between a pilot portion 30 and an adjacent end 28, 29 of the mounting portion 19 may be repeatedly mounted to and subsequently separated from a connector mounting component 12. Many constructions of connector components 10 that are constructed such that the first retention structure 17 and/or the second retention structure 18 may be repeatedly engaged to and disengaged from a portion of the connector body 13 adjacent a pilot portion 30 are well known. An example of such a known construction of a connector component 10 is shown in FIG. 3, which is a sectional view of a prior art connector component 10 mounted to a connector mounting component 12. The prior art connector component 10 shown in FIG. 3 has first retention structure 17 that comprises a retention rib 32 that is integrally engaged to the connector body 13 of the connector component 10 and that extends outward of adjacent portions of the connector body 13 in directions perpendicular to the central axis 20 of the mounting portion 19. The second retention structure 18 of the prior art connector component 10 shown in FIG. 3 comprises a mounting nut 16 that may be threadedly engaged to a portion of the connector body 13 adjacent the second end 29 of the mounting portion 19 of the connector body 13. The connector body 13 of the prior art connector component 10 shown in FIG. 3 also defines a pilot portion 30 adjacent the second end 29 of the mounting portion 19 of the connector body 13. The pilot portion 30 of the prior art connector component 10 shown in FIG. 3 is of such a shape and size that it may be passed through the connector opening 14 in the connector mounting component 12 shown in FIG. 3 and also such that the mounting nut 16 may be passed over the pilot portion 30. Such a construction of a connector component 10 allows the mounting nut 16, which is the second retention structure 18 to be repeatedly engaged to and disengaged from the connector body 13 of the connector component 10. The processes of engaging the mounting nut 16 to the connector body 13 and disengaging the mounting nut 16 from the connector body 13 are relatively time consuming as a result of the threaded nature of the engagement of the mounting nut 16 to the connector body 13. As a result, the process of mounting a connector component 10 such as the one shown in FIG. 3 to a connector mounting component 12 and also the process of separating such a connector component 10 from a connector mounting component 12 are relatively time consuming.

The construction of the connector component 10 of the present invention is such that the first retention structure 17 and/or the second retention structure 18 may be engaged to and disengaged from the connector body 13 in a much easier and quicker manner than the mounting nut 16 of the prior art connector component 10 shown in FIG. 3. The connector component 10 is constructed in such a manner to enable repeated mounting of the connector component 10 to and subsequent separation of the connector component 10 from a connector mounting component 12 as was described above. As was mentioned above, the construction of the connector component 10 is such that at least one of the first retention structure 17 and the second retention structure 18 may be repeatedly engaged to and subsequently disengaged from a portion of the connector body 13 adjacent a pilot portion 30. The connector component 10 is, in fact, constructed in such a manner that one of the first retention structure 17 and the second retention structure 18 is a quick connect clip 33 that may be repeatedly engaged to and subsequently disengaged from a portion of the connector body 13 adjacent a pilot portion 30. Such a construction of the connector component 10 makes the process of mounting the connector component 10 to a connector mounting component 12 and also the process of separating the connector component 10 from a connector mounting component 12 relatively quick and easy. The connector body 13 of the connector component 10 of the present invention defines one or more retention structure slots 24 adjacent the first end 28 of the mounting portion 19 of the connector body 13 and/or adjacent the second end 29 of the mounting portion 19 of the connector body 13. If the first retention structure 17 of the connector component 10 comprises a quick connect clip 33 one or more retention structure slot(s) 24 are defined adjacent the first end 28 of the mounting portion 19 of the connector body 13. If the second retention structure 18 of the connector component 10 comprises a quick connect clip 33 one or more retention structure slot(s) 24 are defined adjacent the second end 29 of the mounting portion 19 of the connector body 13. Each of the retention structure slots 24 defined by the connector body 13 extend inwardly from outer surfaces of the connector body 13. The construction of the connector body 13 and any quick connect clips 33 of the first retention structure 17 or the second retention structure 18 is such that each quick connect clip 33 may be quickly and easily slid or snapped into or out of its proper engagement with the connector body 13 and one or more of the retention structure slots 24 of the connector component 10. There may be any number of retention structure slots 24 with any number of configurations adjacent the first end 28 of the mounting portion 19 of the connector body 13 and/or the second end 29 of the mounting portion 19 of the connector body 13. Preferably, any retention structure slot(s) 24 defined adjacent either the first end 28 or the second end 29 of the mounting portion 19 of the connector body 13 comprise a retention structure slot 24 that extends continuously around the entire perimeter of the connector body 13 in directions perpendicular to the central axis 20 of the mounting portion 19. The connector components 10 according to the present invention that are shown in the figures define retention structure slots 24 of such a configuration.

Quick connect clips 33 according to the present invention may be constructed in any of a number of ways but all quick connect clips 33 according to the present invention have some characteristics in common. These common characteristics of quick connect clips 33 according to the present invention are best illustrated in FIGS. 4a, 4b, 4c, 5a, 5b, 5c, 8a, 8b, and 8c each of which shows a well known embodiment of a quick connect clip 33 according to the present invention. Quick connect clips 33 according to the present invention have a clip body 21 that is disposed at a distance from and extends around a clip central axis 22. The clip body 21 of a quick connect clip 33 according to the present invention extends at least 180 degrees around the clip central axis 22. A clip opening 23 is, thus, defined within an inner perimeter 25 of the clip body 21. When a quick connect clip 33 of the retention structure 17, 18 of the connector component 10 is properly engaged to the connector body 13, a portion of the connector body 13 is disposed within the clip opening 23 of the quick connect clip 33 with the clip central axis 22 disposed substantially parallel to the central axis 20 of the mounting portion. When a quick connect clip 33 is properly engaged to the connector body 13, the quick connect clip 33 has at least some portion of the inner perimeter 25 of its clip body 21 disposed within a portion of a retention structure slot 24 that extends in directions perpendicular to the central axis 20 of the mounting portion 19. Such an engagement of a quick connect clip 33 to one or more retention structure slots 24 of the connector body 13 prevents substantial relative translation of the quick connect clip 33 and the connector body 13 in directions parallel to the central axis 20 of the mounting portion 19 of the connector body 13. A quick connect clip 33 constructed and properly engaged to a connector body 13 according to the present invention is also prevented from any substantial translation relative to the connector body 13 in directions perpendicular to the central axis 20 of the mounting portion 19 of the connector body 13. Such perpendicular relative translation between a quick connect clip 33 and a connector body 13 constructed and properly engaged to one another according to the present invention is prevented by eventual abutment between portions of the quick connect clip 33 and the connector body 13. In order for a quick connect clip 33 that is properly engaged to a connector body 13 to be disengaged from or subsequently engaged to the connector body 13, the quick connect clip 33 must be elastically deformed. Three types of quick connect clips 33 that are well known and that are well suited for use as retention structure 17, 18 for a connector component 10 according to the present invention are described in detail below. In addition to the three specific examples of quick connect clips 33 described below, one of ordinary skill in the art could easily imagine a number of other types of quick connect clips 33 that would be constructed and that would function according to the general guidelines outlined above.

Figure 4A:
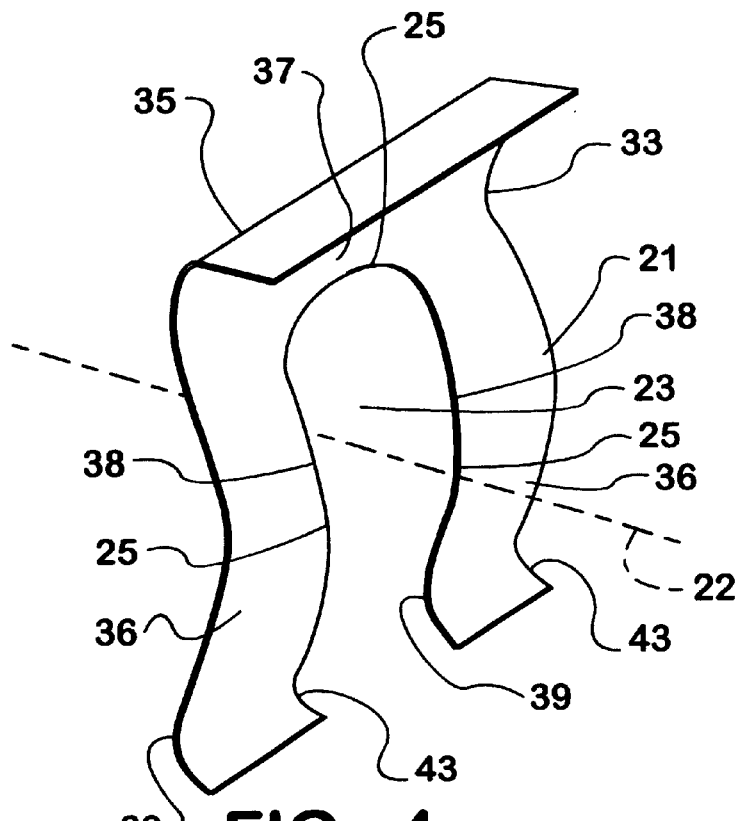
FIG. 4a is a perspective view of a lock retention clip that may be utilized as retention structure of the connector component of the present invention.
Figure 4B:
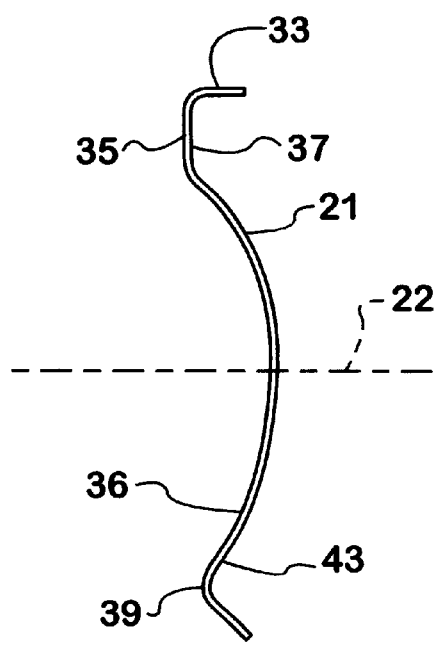
FIG. 4b is a side view of a lock retention clip that may be utilized as retention structure of the connector component of the present invention.
Figure 4C:
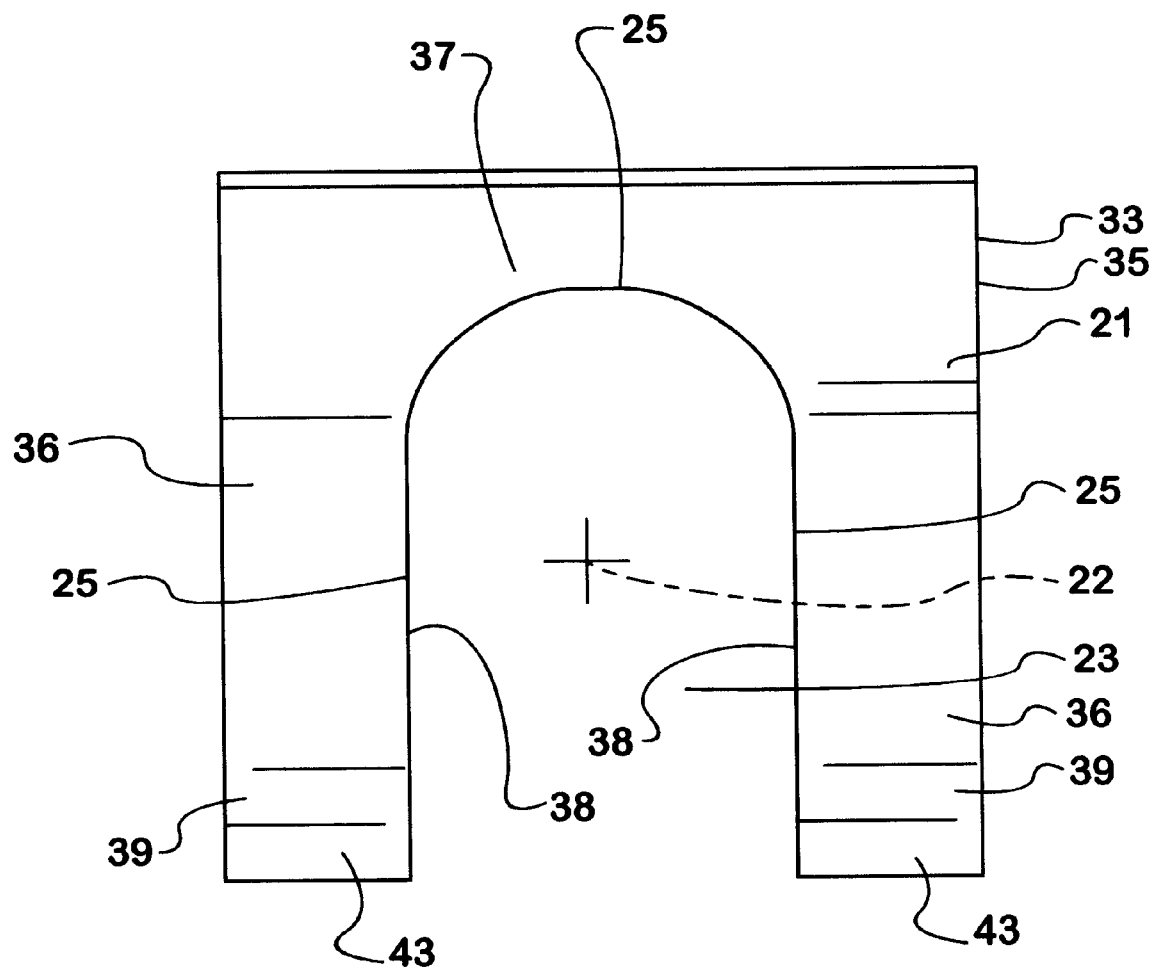
FIG. 4c is a front view of a lock retention clip that may be utilized as retention structure of the connector component of the present invention.
Figure 5A:
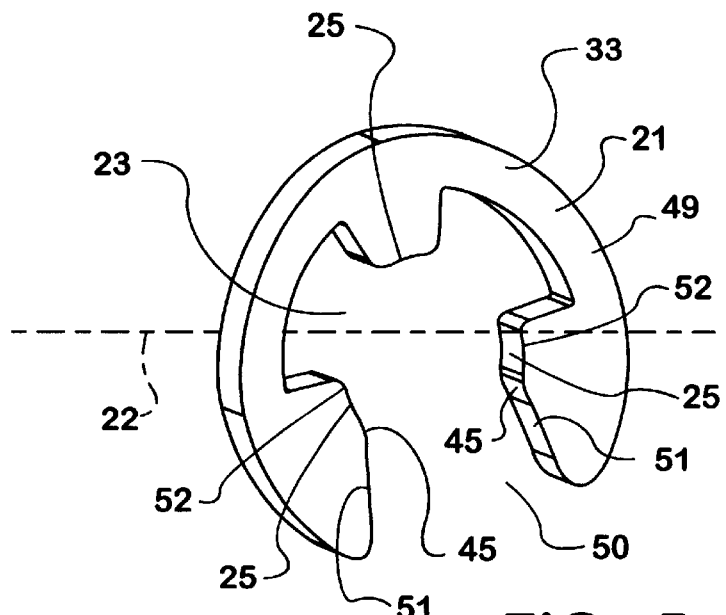
FIG. 5a is a perspective view of an E-clip that may be utilized as retention structure of the connector component of the present invention.
Figure 5B:
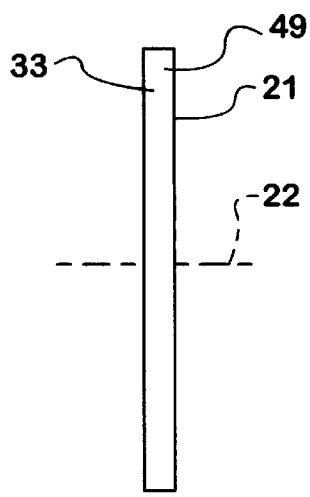
FIG. 5b is a side view of a lock retention clip that may be utilized as retention structure of the connector component of the present invention.
Figure 5C:
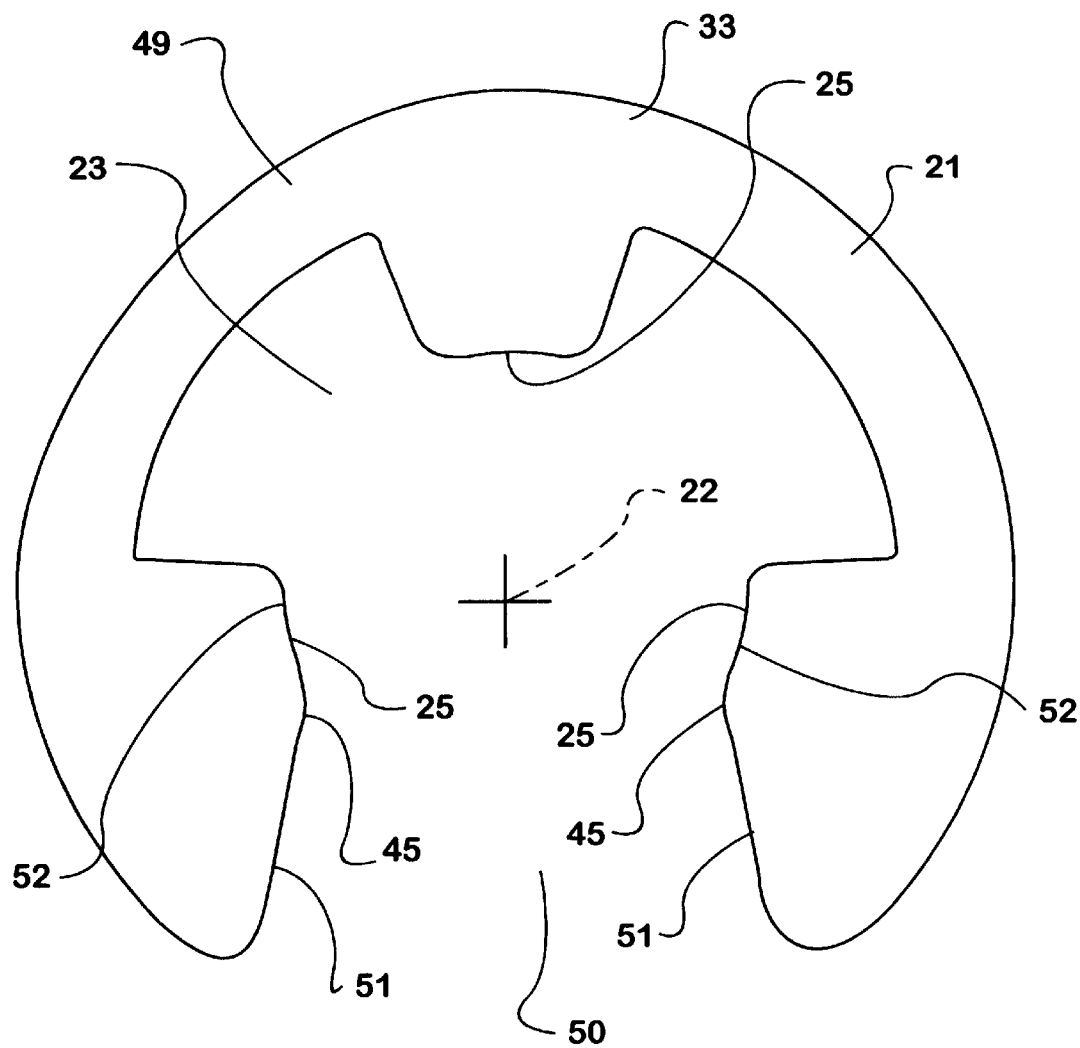
FIG. 5c is a front view of an E-clip that may be utilized as retention structure of the connector component of the present invention.
Figure 6A:
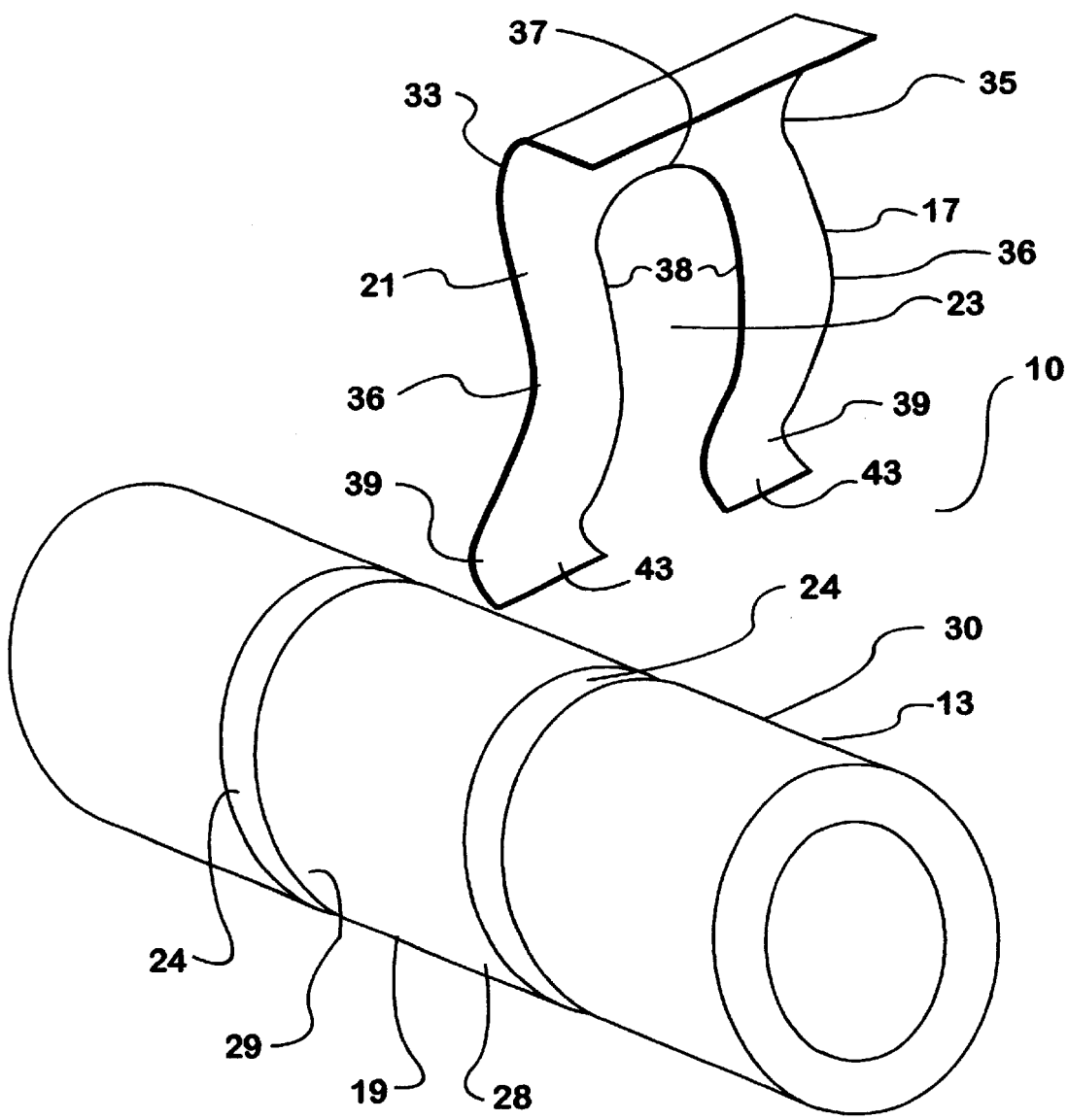
FIG. 6a is a perspective view showing an early stage in the process of engaging a lock retention clip that is retention structure of a connector component to a connector body of the connector component.
Figure 6B:
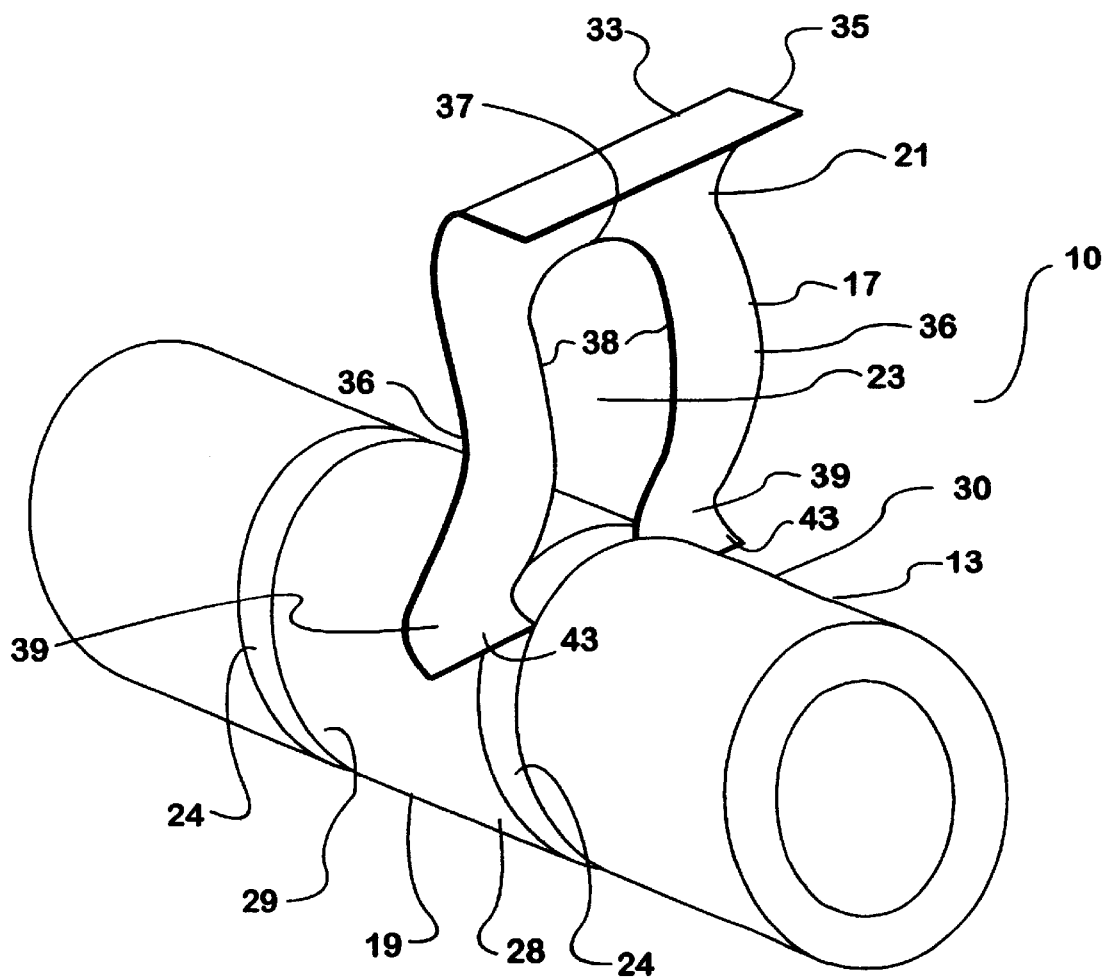
FIG. 6b is a perspective view showing an intermediate stage in the process of engaging a lock retention clip that is retention structure of a connector component to a connector body of the connector component.
Figure 6C:
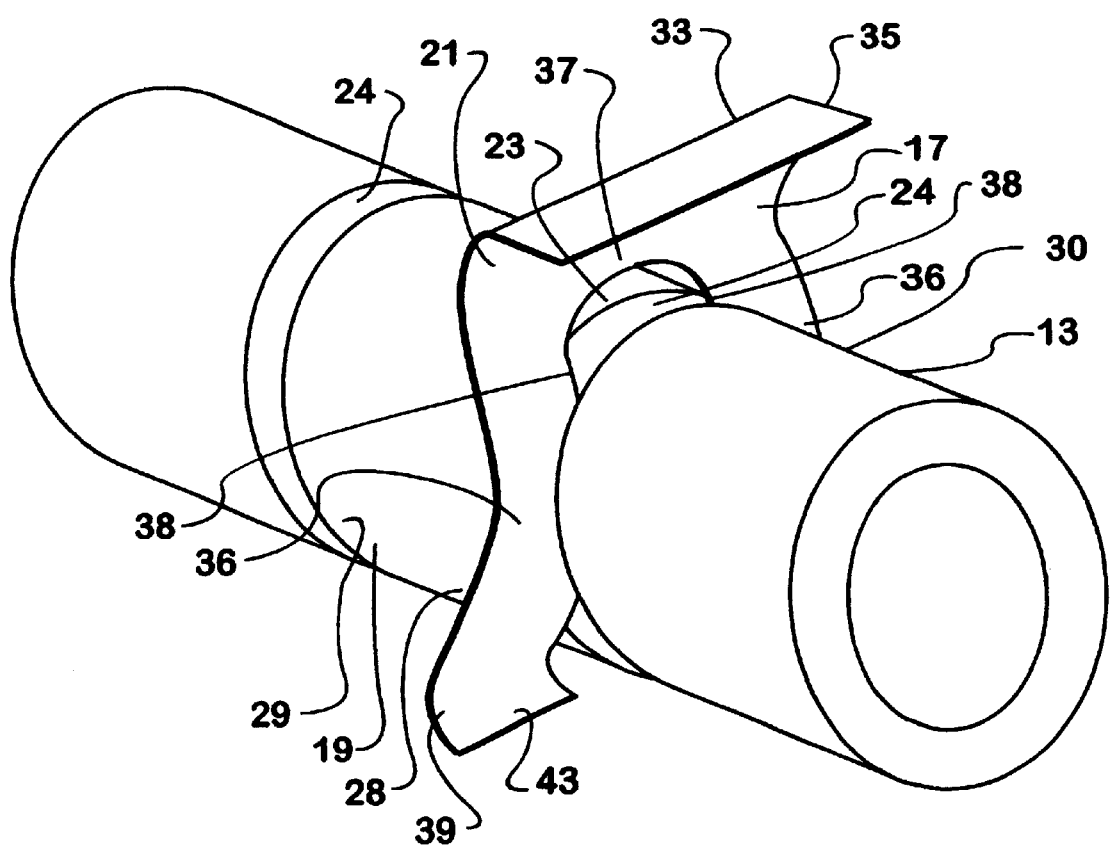
FIG. 6c is a perspective view showing a lock retention clip that is retention structure of a connector component engaged to a connector body of the connector component.
Figure 7A:
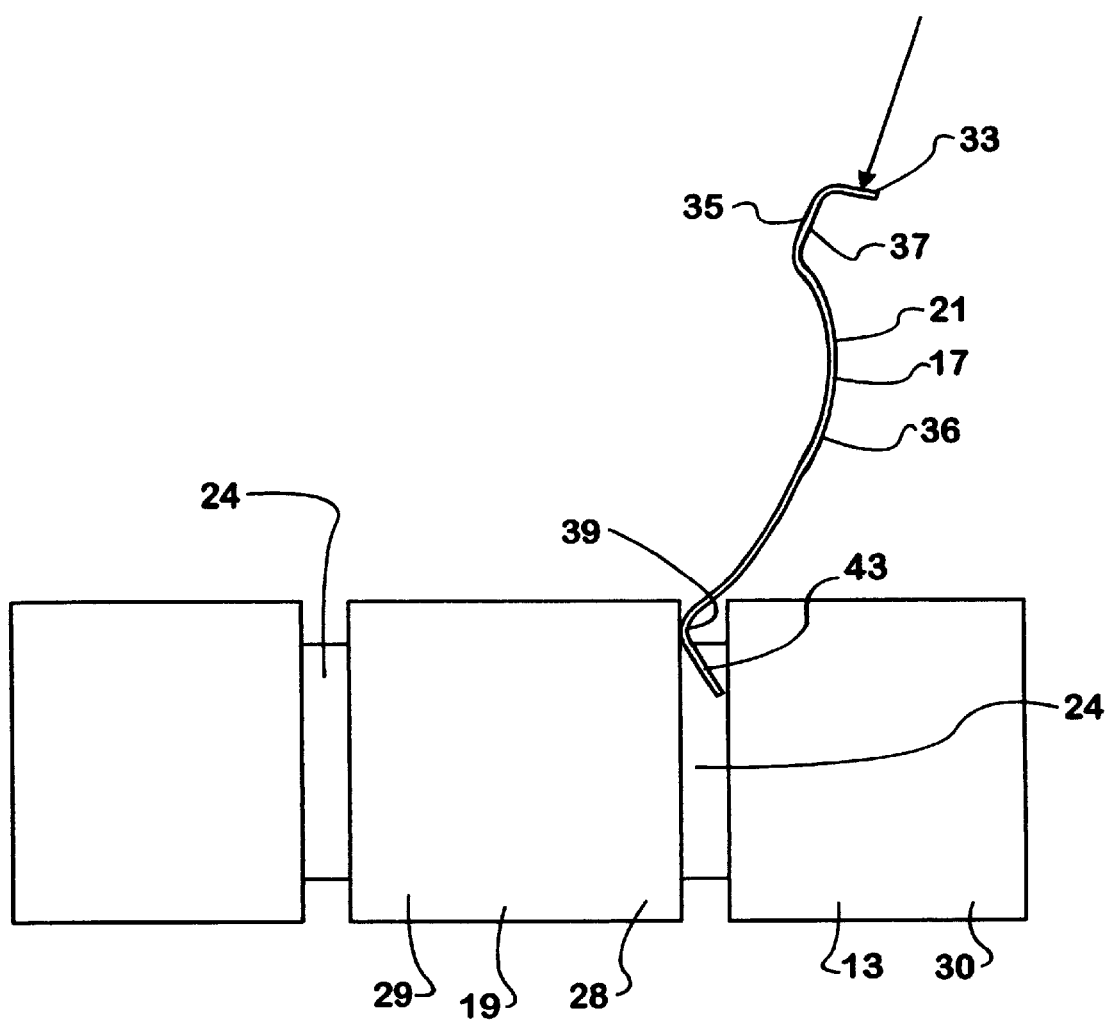
FIG. 7a is a side view showing an early stage in the process of engaging a lock retention clip that is retention structure of a connector component to a connector body of the connector component.
Figure 7B:
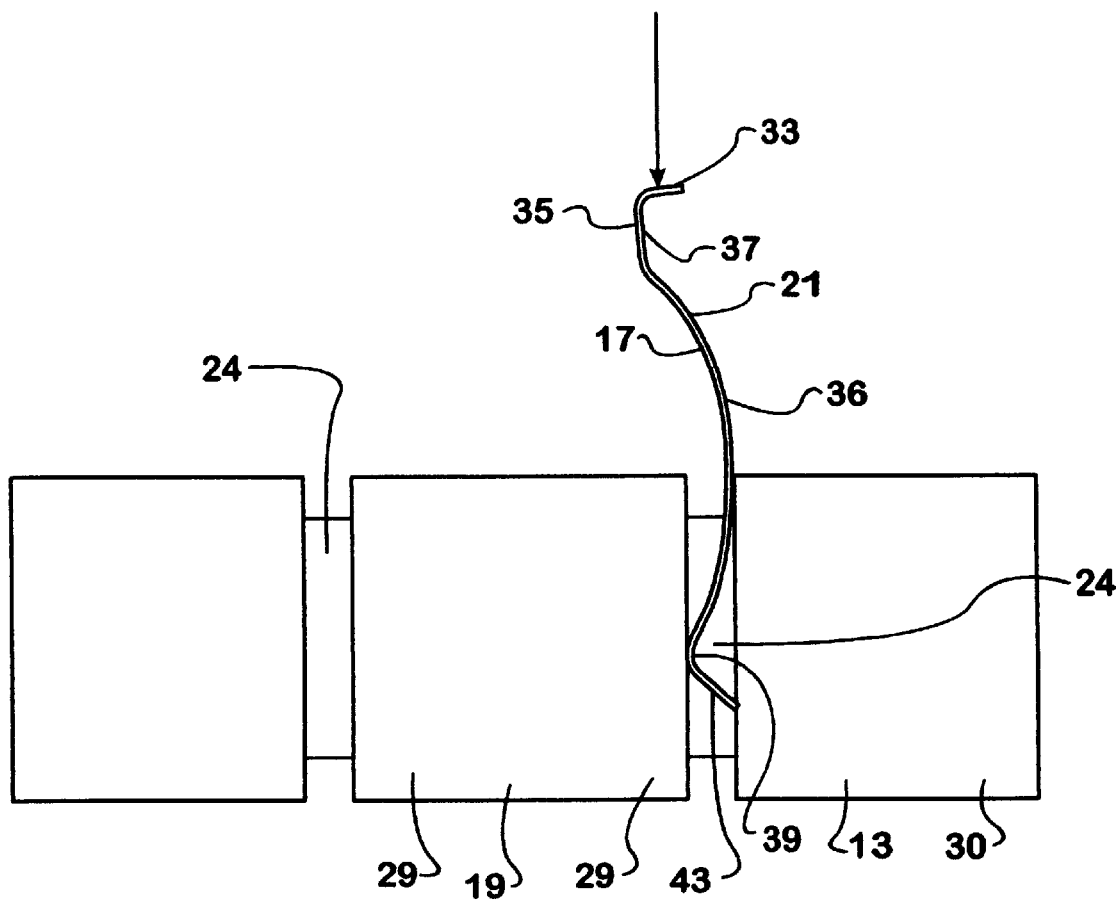
FIG. 7b is a side view showing an intermediate stage in the process of engaging a lock retention clip that is retention structure of a connector component to a connector body of the connector component.
Figure 7C:
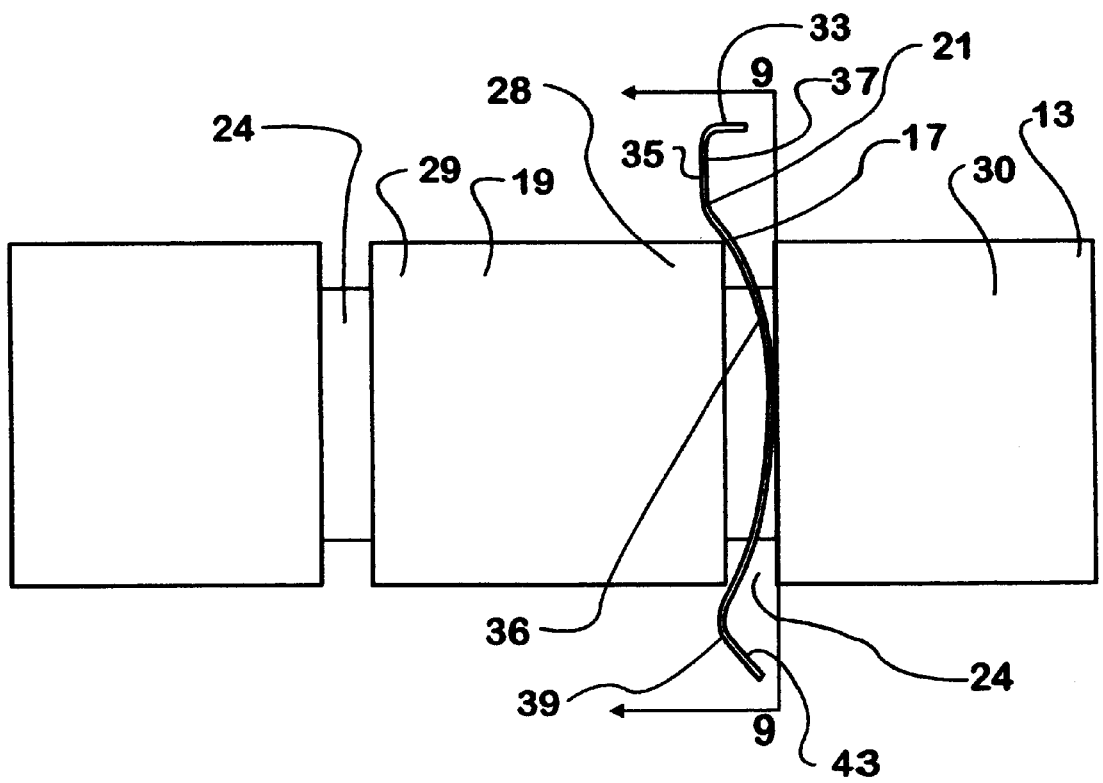
FIG. 7c is a side view showing a lock retention clip that is retention structure of a connector component engaged to a connector body of the connector component.
Figure 9:
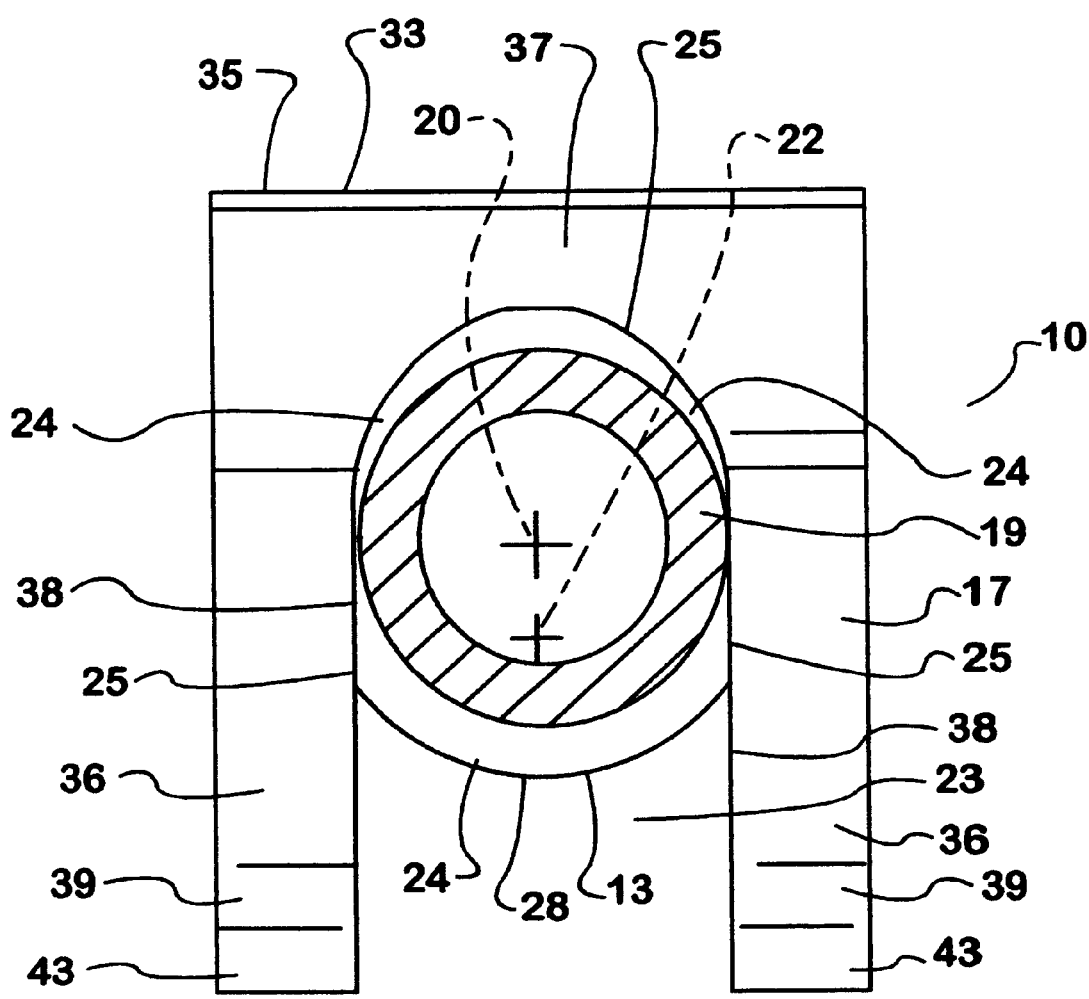
FIG. 9 is a sectional view through line 9—9 of FIG. 7c showing the cross-section of a portion of a connector body that is disposed within the clip opening of a lock retention clip that is retention structure of the connector component.

One construction of a quick connect clip 33 that is well known is shown in FIGS. 4a, 4b, and 4c. The type of quick connect clip 33 shown in these figures is commonly used to retain lock cylinders to doors of automobile bodies and will, therefore, be referred to hereinafter as a lock retention clip 35. The clip body 21 of such a lock retention clip 35 is constructed of a material that is generally relatively thin in directions parallel to the clip central axis 22 and relatively wide in directions perpendicular to the clip central axis 22. The clip body 21 of a lock retention clip 35 according to the present invention comprises a bridge portion 37 from which two legs 36 extend in a same direction and relatively parallel to one another. Inner edges 38 of the legs 36 of such a lock retention clip 35 also extend substantially parallel to one another. When a lock retention clip 35 is properly engaged to a connector body 13, a portion of the connector body 13 is disposed within the clip opening 23 defined between the legs 36 of the lock retention clip 35. Also, when a lock retention clip 35 is properly engaged to a connector body 13 portions of its clip body 21 extend outwardly from adjacent portions of the connector body 13 in directions perpendicular to the central axis 20 of the mounting portion 19 of the connector body 13. A portion of the inner edge 38 of each leg 36 is disposed within a portion of retention structure slot 24 that extends in directions perpendicular to the central axis 20 of the mounting portion 19 of the connector component 10 when the lock retention clip 35 is properly engaged to the connector body 13. This is best illustrated in FIGS. 6c and 7c. A lock retention clip 35 engaged to a connector body 13 with a portion of its legs 36 disposed within retention structure slots 24 in such a manner is prevented from translating substantially relative to the connector body 13 in directions parallel to the central axis 20 of the mounting portion 19 of the connector body 13. Each leg 36 of a lock retention clip 35 according to the present invention defines a retention ridge 39. Each retention ridge 39 of a lock retention clip 35 has a depth in directions parallel to the clip central axis 22 that is greater than a width of at least some portion of the retention structure slot 24 within which the leg 36 that defines the retention ridge 39 is disposed when the lock retention clip 35 is properly engaged to the connector body 13. As is shown in FIGS. 4a, 4b, 4c, 6a, 6b, 6c, 7a, 7b, 7c, 10a, 10b and 10c a lock retention clip 35 has its retentions ridges 39 formed by an outer end portion 43 of its legs 36. As is best shown in FIGS. 6c, 7c, 9, and 10a, when a lock retention clip 35 is properly engaged to a connector body 13, the portion of each of its legs 36 that forms the retention ridge 39 is disposed beyond and outside of the retention structure slot 24 within which the leg 36 is disposed. Each retention ridge 39 of the lock retention clip 35 is also located close enough to an inner edge 38 of the leg 36 which forms it that, when the lock retention clip 35 is disengaged from the connector body 24 by sliding its legs 36 out of the retention structure slots 24, each retention ridge 39 must also slide through the retention structure slots 24. As a result of each retention ridge 39 having a depth that is greater than the width of a corresponding retention structure slot 24, each retention ridge 39 must be elastically deformed in order for it to fit within and be slid through the retention structure slot 24 in order for the lock retention clip 35 to be disengaged from a connector body 13. Thus, when the lock retention clip 35 is disengaged from the connector body 13, by sliding its legs 36 out of engagement with the retention structure slots 24, it passes through a catch point at which the retention ridges 39 abut surfaces of the connector body 13 adjacent the retention structure slots 24. Once the lock retention clip 35 reaches this catch point, sufficient force must be applied to the lock retention clip 35 to elastically deform and wedge each retention ridge 39 into a corresponding retention structure slot 24 before further disengagement of the lock retention clip 35 from the connector body 13 can occur. Such a construction of a lock retention clip 35 and a corresponding connector body 13, thus, is resistant to inadvertent and undesirable disengagement of the lock retention clip 35 and the connector body 13, yet allows the components to be intentionally disengaged from one another.

Figure 10A:
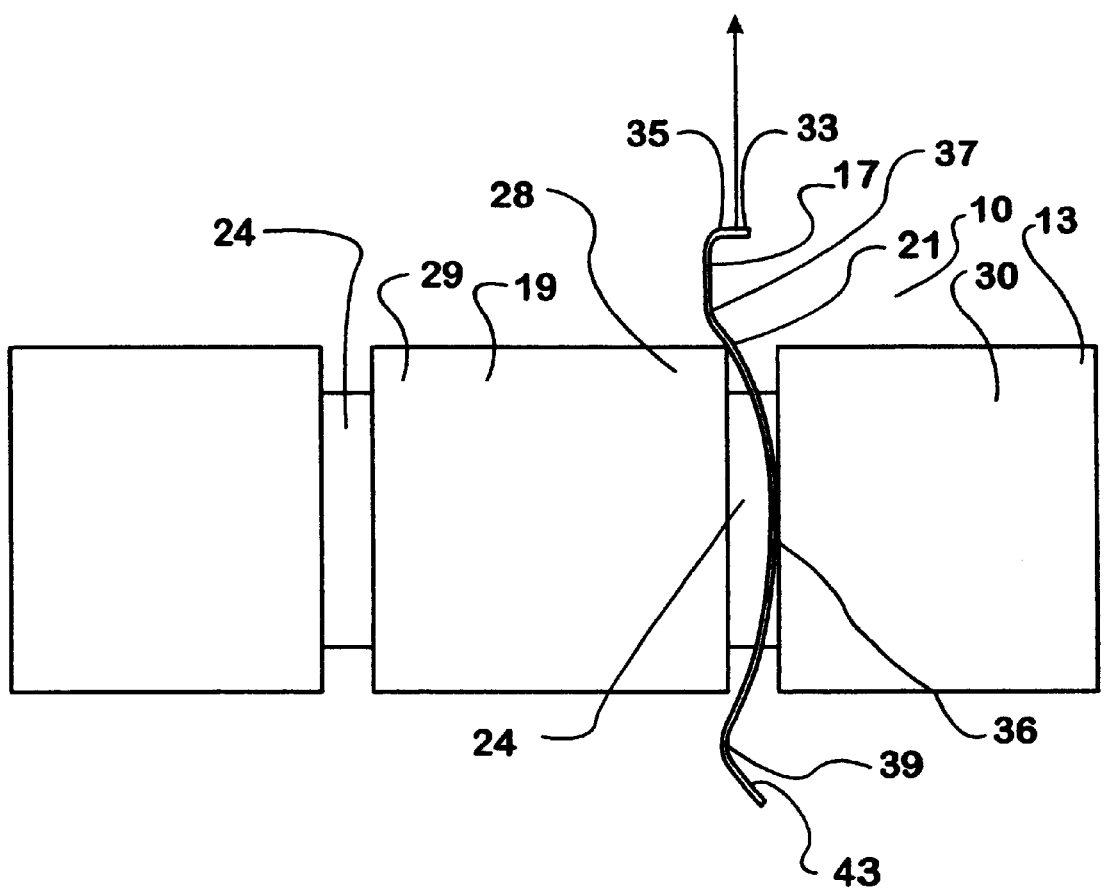
FIG. 10a is a side view showing an early stage in the process of disengaging a lock retention clip that is retention structure of a connector component from a connector body of the connector component.
Figure 10B:
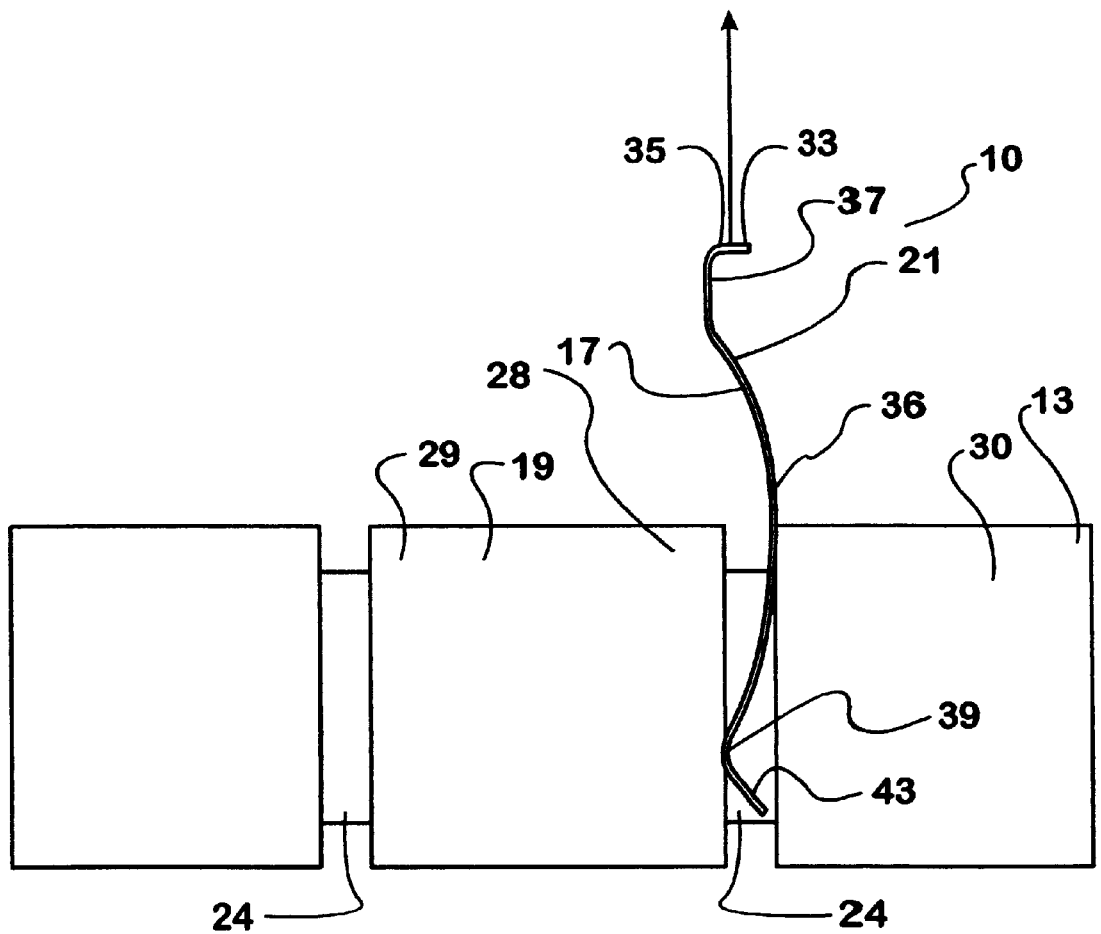
FIG. 10b is a side view showing an intermediate stage in the process of disengaging a lock retention clip that is retention structure of a connector component from a connector body of the connector component.
Figure 10C:
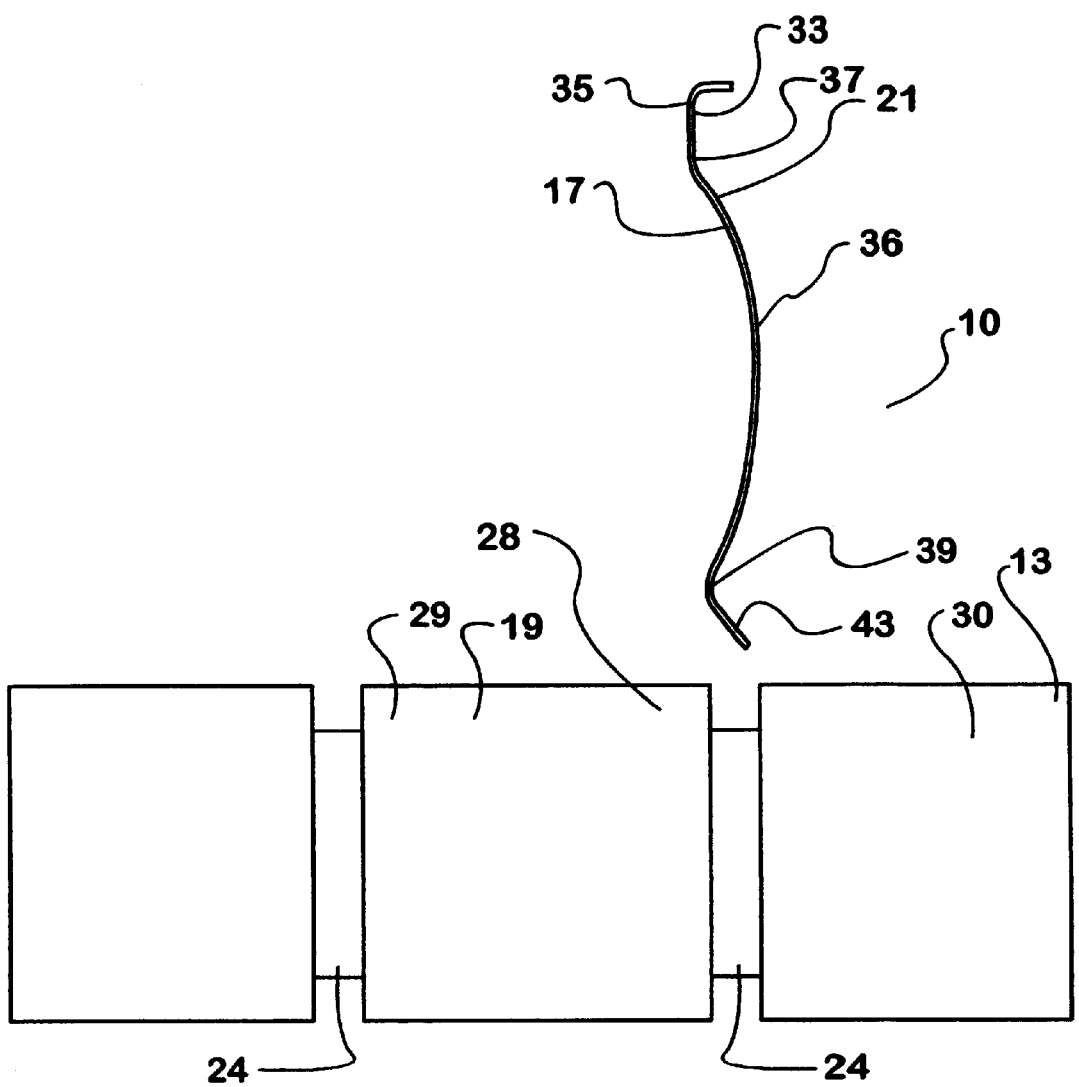
FIG. 10c is a side view showing a lock retention clip that is retention structure of a connector component engaged from a connector body of the connector component.

A connector component 10 constructed according to the present invention with retention structure 17, 18 that comprises a lock retention clip 35, enables relatively quick and easy engagement of the lock retention clip 35 to and disengagement of the lock retention clip 35 from the connector body 13. As is shown in FIGS. 6a and 7a the first step in the process of engaging a lock retention clip 35 to a connector body 13 is to insert an outer end portion 43 of each leg 36 of the lock retention clip 35 into a retention structure slot 24 defined by the connector body 13. The process of properly engaging a lock retention clip 35 to a connector body 13 is completed by sliding the bridge portion 37 of the lock retention clip 35 toward the connector body 13 until the lock retention clip 35 is properly engaged to the connector body 13. The legs 36 of the lock retention clip 35 are inserted into the retention structure slots 24 to at least a point at which each retention ridge 39 of the lock retention clip 35 has been slid through and then out of engagement with and beyond a corresponding retention structure slot 24. Successive stages of the process of engaging a lock retention clip 35 to a connector body 13 are illustrated in FIGS. 6a, 6b, and 6c and also in FIGS. 7a, 7b, and 7c. The process of separating from a connector body 13, a lock retention clip 35 that is properly engaged to the connector body 13, includes sliding the legs 36 of the lock retention clip 35 out of the retention structure slots 24 by sliding the bridge portion 37 of the lock retention clip 35 away from the connector body 13. Successive stages of the process of disengaging a lock retention clip 35 from a connector body are illustrated in FIGS. 10a, 10b, and 10c.

Another well known type of quick connect clip 33 that may be used as retention structure 17, 18 for the connector component 10 of the present invention is a quick connect clip 33 that is commonly known as an E-clip 49. E-clips 49 are illustrated in FIGS. 5a, 5b, 5c, 11a, 11b, 11c, 12a, 12b, and 12c. As with all quick connect clips 33 according to the present invention, an E-clip 49 has a clip body 21 that is disposed at a distance from and extends at least 180 degrees around a clip central axis 22 of the E-clip 49. A clip opening 23 is defined within an inner perimeter 25 of the clip body 21 of an E-clip 49. The clip body 21 of an E-clip 49 is disposed between two relatively closely spaced planes that are oriented perpendicular to the clip central axis 22 of the E-clip 49. The construction of an E-clip 49 is such that, when the E-clip 49 is in its free state, a distance between terminal ends 45 of a clip body 21 of an E-clip 49 is less than a maximum width of the clip opening 23 between opposite portions of an inner perimeter 25 of its clip body 21. When an E-clip 49 that is retention structure 17, 18 of a connector component 10 is properly engaged to a connector body 13 according to the present invention, a portion of the connector body 13 adjacent the mounting portion 19 of the connector body 13 is disposed within the clip opening 23 of the E-clip 49. Also, when an E-clip 49 which is retention structure 17, 18 of the connector component 10 is properly engaged to a connector body 13, the clip central axis 22 of the E-clip 49 is disposed substantially parallel to a central axis 20 of the mounting portion 19 of the connector body 13. The construction of an E-clip 49 and a connector body 13 according to the present invention is such that, when an E-clip 49 is properly engaged to the connector body 13, at least a portion of an inner perimeter 25 of a clip body 21 of the E-clip 49 is disposed within at least a portion of a retention structure slot 24. At least a portion of retention structure slot 24 within which a portion of the inner perimeter 25 of the clip body 21 is disposed, when the E-clip 49 is properly engaged to the connector body 13, extends in directions substantially perpendicular to the central axis 20 of the mounting portion 19 of the connector body 13. Such a construction and engagement to one another of the connector body 13 and an E-clip 49 prevents any substantial relative translation between the E-clip 49 and the connector body 13 in directions parallel to the central axis 20 of the mounting portion 19 of the connector body 13. The construction of an E-clip 49 and a corresponding connector body 13 is also such that, when the E-clip 49 is properly engaged to the connector body 13, a distance between terminal ends 45 of the clip body 21 of the E-clip 49 is less than cross-sectional widths of the portion of the connector body 13 that is disposed within the clip opening 23. Such a construction and engagement to one another of an E-clip 49 and a connector body 13 ensures that any relative translation between them in directions perpendicular to the clip central axis 22 of the E-clip 49 eventually results in abutment between some portion of the inner perimeter 25 of the clip body 21 of the E-clip 49 and the connector body 13. Thus, an E-clip 49 that is properly engaged to a connector body 13 according to the present invention is restrained against substantial translation relative to the connector body 13 both in directions parallel to its clip central axis 22 and perpendicular to its clip central axis 22.

Figure 11A:
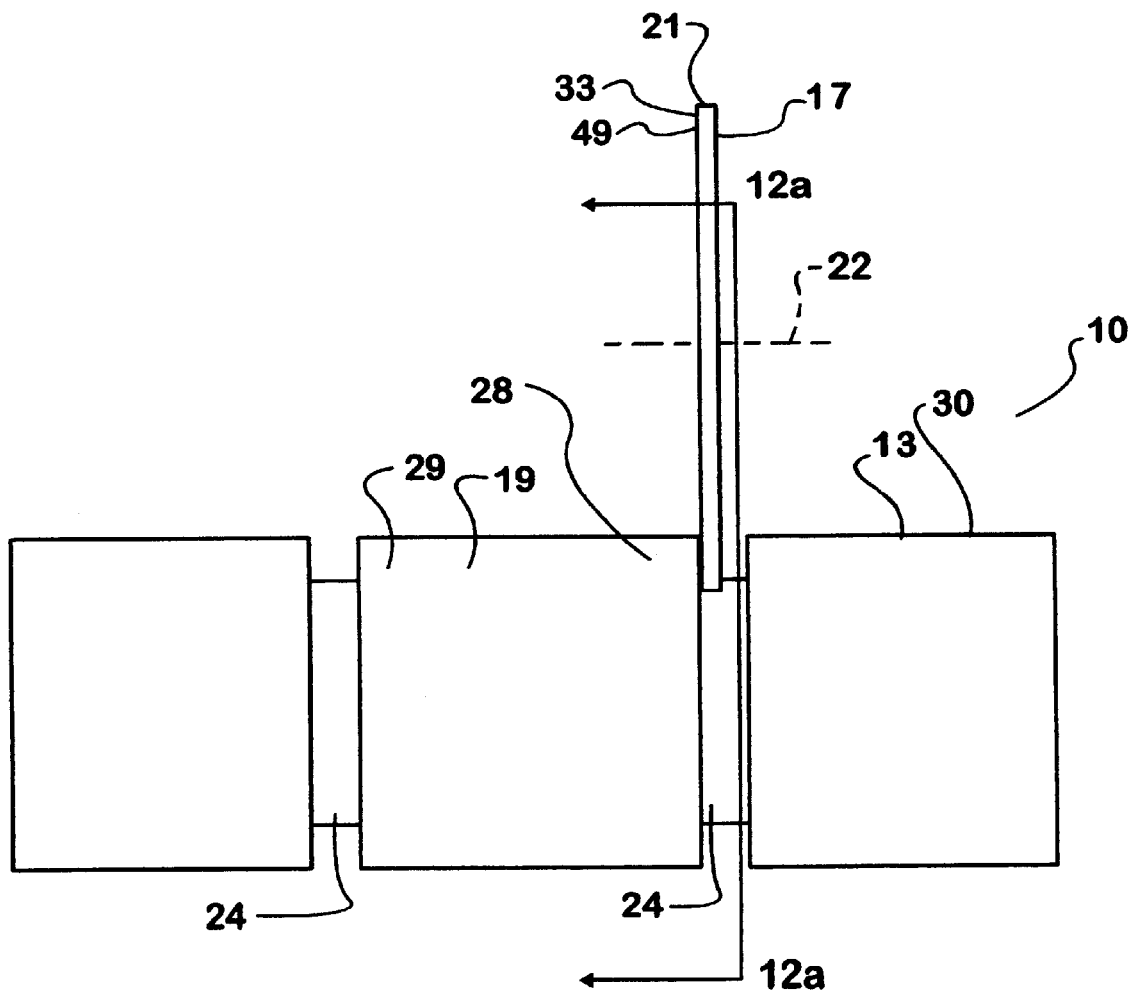
FIG. 11a is a side view showing an early stage in the process of engaging an E-clip that is retention structure of a connector component to a connector body of the connector component.
Figure 11B:
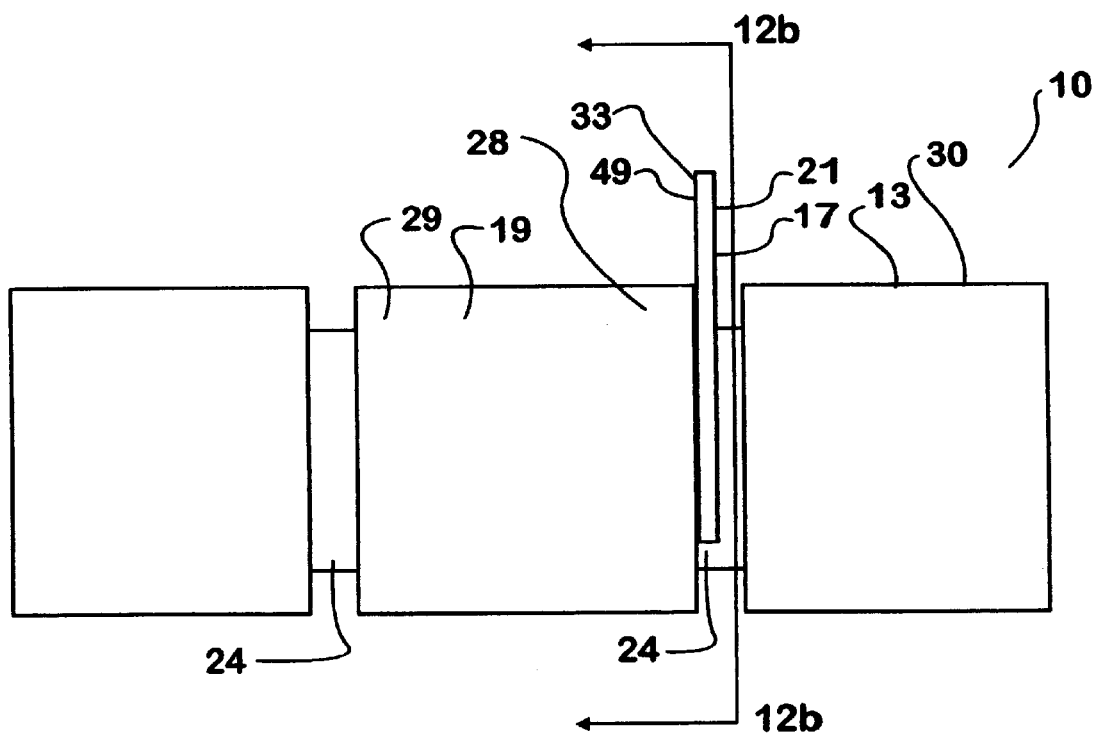
FIG. 11b is a side view showing an intermediate stage in the process of engaging an E-clip that is retention structure of a connector component to a connector body of the connector component.
Figure 11C:
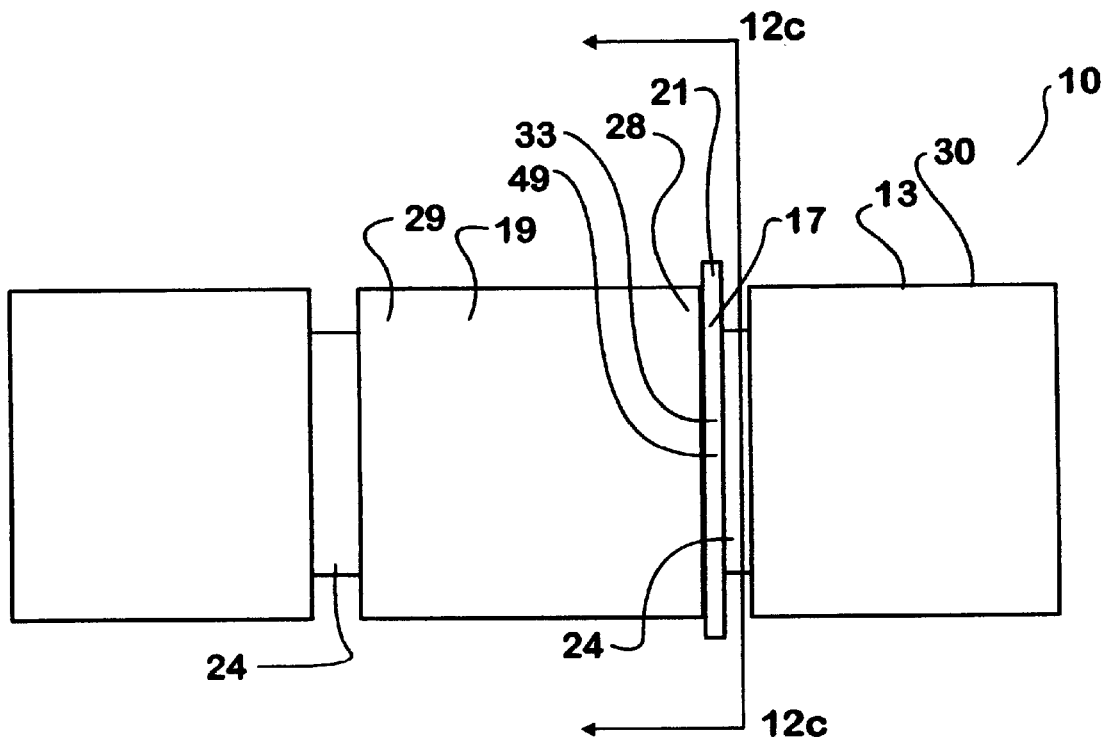
FIG. 11c is a side view showing an E-clip that is retention structure of a connector component engaged to a connector body of the connector component.
Figure 12A:
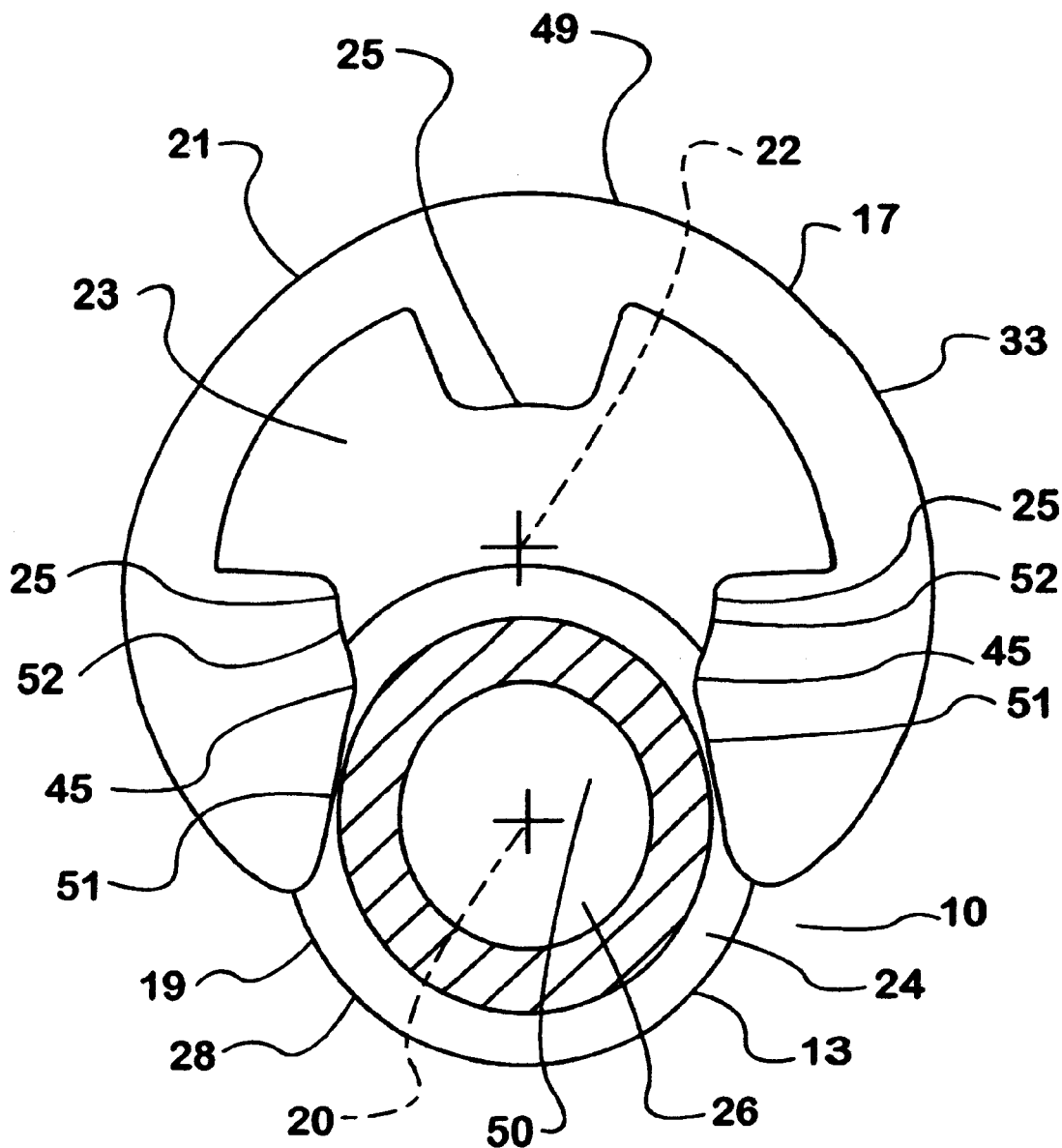
FIG. 12a is a sectional view through line 12a–12a of FIG. 11a showing an early stage in the process of engaging an E-clip that is retention structure of a connector component to a connector body of the connector component.
Figure 12B:
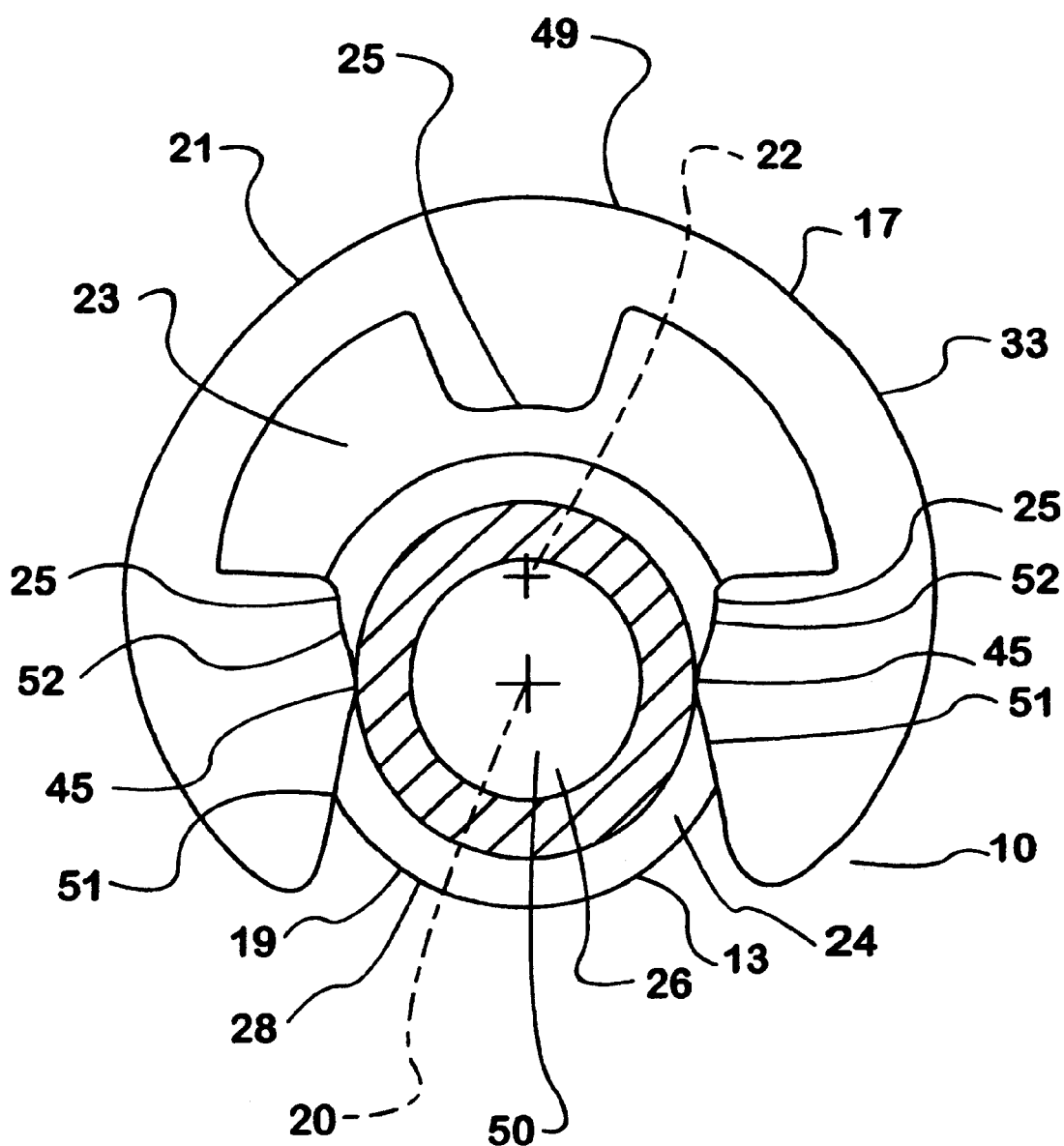
FIG. 12b is a sectional view through line 12b–12b of FIG. 11b showing an intermediate stage in the process of engaging an E-clip that is retention structure of a connector component to a connector body of the connector component.
Figure 12C:
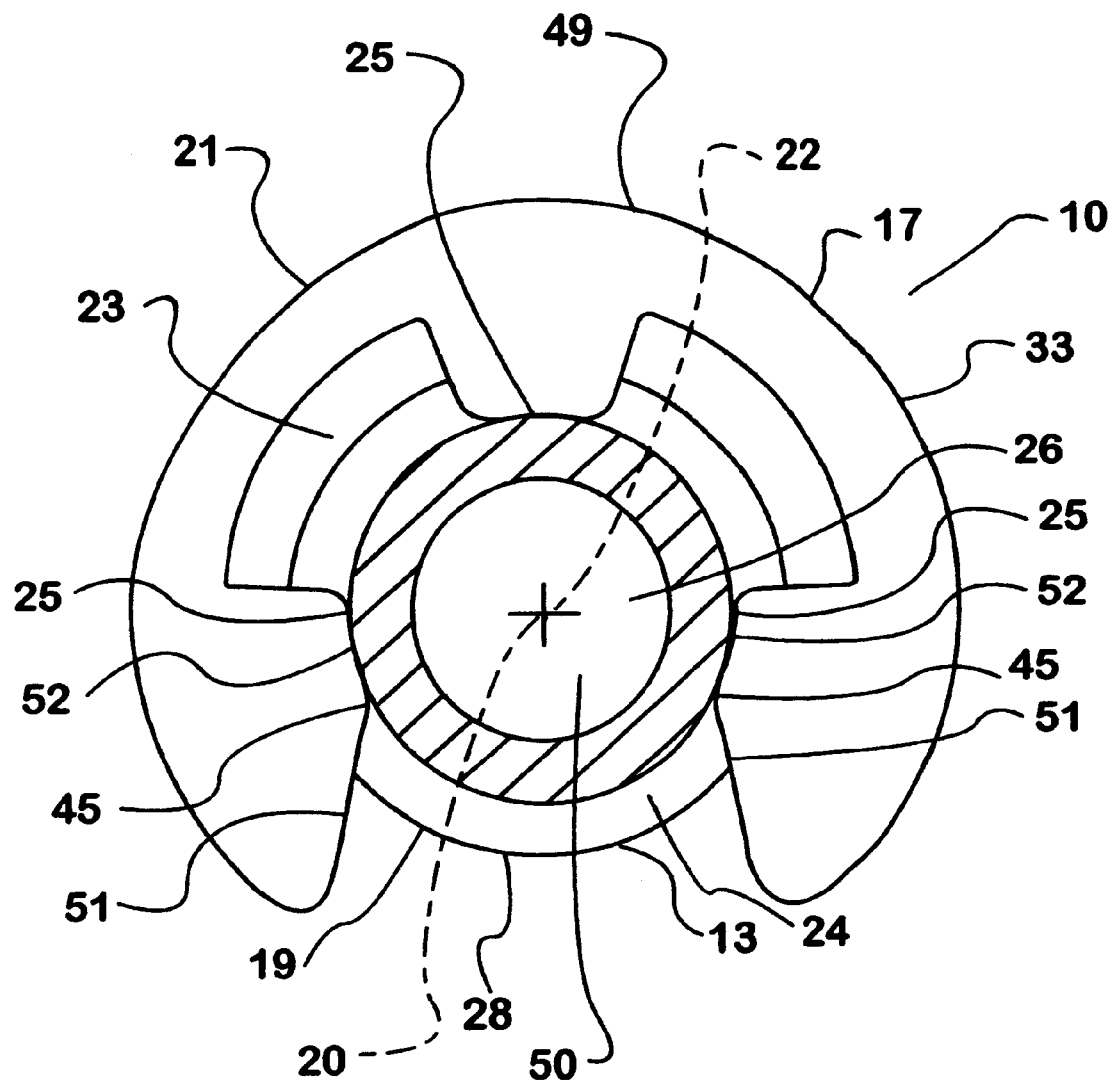
FIG. 12c is a sectional view through line 12c–12c of FIG. 11c showing an E-clip that is retention structure of a connector component engaged to a connector body of the connector component.

The processes by which an E-clip 49 is engaged to and disengaged from a connector body 13 according to the present invention are essentially the same as the well known processes by which E-clips 49 are generally engaged to or disengaged from any type of component. The process of engaging an E-clip 49 to a connector body 13 includes sliding the appropriate portion of the connector body 13 through a gap 50 between terminal ends 45 of the clip body 21 and into the clip opening 23 until the connector body 13 is properly disposed within the clip opening 23. During this process of engaging an E-clip 49 to the connector body 13, the clip body 21 must be elastically deformed in such a manner that the terminal ends 45 of the clip body 21 move away from each other in order to allow the connector body 13 to pass between the terminal ends 45 of the clip body 21. Successive stages in the process of engaging an E-clip 49 to a connector body 13 in such a manner are shown in FIGS. 11a, 11b, and 11c, and also in FIGS. 12a, 12b, and 12c. E-clips 49 have outer camming surfaces 51 that are disposed adjacent the terminal ends 45 of their clip bodies 21 and that extend away from one another as they extend away from the clip central axis 22. During the process of engaging the E-clip 49 to the connector body 13, abutment between the outer camming surfaces 51 of the E-clip 49 and surfaces of the connector body 13 causes the terminal ends 45 of the clip body 21 to be wedged apart so that the connector body 13 may pass between the terminal ends 45 of the clip body 21. The process of disengaging an E-clip 49 from a connector body 13 includes withdrawing the connector body 13 from the clip opening 23 of the E-clip 49 through the gap 50 between terminal ends 45 of the clip body 21. An E clip 49 also includes inner camming surfaces 52 that are disposed adjacent the terminal ends 45 of the clip body 21 and that extend away from each other as they extend away from the gap 50 between the terminal ends 45 of the clip body 21. During the process of disengaging an E-clip 49 from a connector body 13 abutment of the inner camming surfaces 52 of the E-clip 49 against surfaces of the connector body 13 causes the terminal ends 45 of the clip body 21 to be wedged apart so that the connector body 13 may pass between the terminal ends 45 of the clip body 21.

Another well known type of quick connect clip 33 that may be used as retention structure 17, 18 for the connector component 10 of the present invention is a quick connect clip 33 that is commonly known as a snap ring clip 53. Snap ring clips 53 are illustrated in FIGS. 8a, 8b, and 8c. As with all quick connect clips 33 according to the present invention, a snap ring clip 53 has a clip body 21 that is disposed at a distance from and extends at least 180 degrees around a clip central axis 22 of the snap ring clip 53. A clip opening 23 is defined within an inner perimeter 25 of the clip body 21 of a snap ring clip 53. The clip body 21 of a snap ring clip 53 is disposed between two relatively closely spaced planes that are oriented perpendicular to the clip central axis 22 of the snap ring clip 53. A snap ring clip 53 is constructed such that, when it is in its free state, a distance between terminal ends 45 of its clip body 21 is less than a maximum width of its clip opening 23 between opposite portions of an inner perimeter 25 of its clip body 21. When a snap ring clip 53 which is retention structure 17, 18 of a connector component 10 is properly engaged to a connector body 13 according to the present invention, a portion of the connector body 13 adjacent the mounting portion 19 is disposed within the clip opening 23 of the snap ring clip 53. Also, when a snap ring clip 53 which is retention structure 17, 18 of the connector component 10 is properly engaged to a connector body 13, the clip central axis 22 of the snap ring clip 53 is disposed substantially parallel to the central axis 20 of the mounting portion 19. When a snap ring clip 53 that is retention structure 17, 18 is properly engaged to a connector body 13, at least a portion of an inner perimeter 25 of its clip body 21 is disposed within at least a portion of a retention structure slot 24 defined by the connector body 13. At least a portion of retention structure slot 24 within which a portion of the inner perimeter 25 of the clip body 21 is disposed, when the snap ring clip 53 is properly engaged to the connector body 13, extends in directions substantially perpendicular to the central axis 20 of the mounting portion 19. Such a construction and engagement to one another of the connector body 13 and a snap ring clip 53 prevents any substantial relative translation between them in directions parallel to the central axis 20 of mounting portion 19. The construction of a snap ring clip 53 and a corresponding connector body 13 is also such that, when the snap ring clip 53 is properly engaged to the connector body 13, a distance between terminal ends 45 of the clip body 21 of the snap ring clip 53 is less than cross-sectional widths of the portion of the connector body 13 that is disposed within the clip opening 23. Such a construction and engagement to one another of a snap ring clip 53 and a connector body 13 ensures that any relative translation between them in directions perpendicular to the clip central axis 22 of the snap ring clip 53 eventually results in abutment between some portion of the inner perimeter 25 of the clip body 21 of the snap ring clip 53 and the connector body 13. Thus, a snap ring clip 53 that is properly engaged to a connector body 13 according to the present invention is restrained against substantial translation relative to the connector body 13 both in directions parallel to its clip central axis 22 and perpendicular to its clip central axis 22.

As with all other types of quick connect clips 33, snap ring clips 53 must be elastically deformed in order to engage or disengage them from the connector body 13. As can be seen in FIGS. 8a, 8b, and 8c the clip body 21 of a snap ring clip 53 defines a pliers engagement hole 54 adjacent each terminal end 45 of its clip body 21. In order to elastically deform the snap ring clip 53 in such a manner that it may be engaged to or disengaged from the connector body 13, snap ring pliers, which are well known, are engaged to each pliers engagement hole 54 of the snap ring clip 53 and manipulated to spread the terminal ends 45 of the clip body 21 away from one another. Spreading of the terminal ends 45 of a snap ring clip 53 away from one another in such a manner causes the clip body 21 of the snap ring clip 53 to expand away from the clip central axis 22 of the snap ring clip 53. In order to engage a snap ring clip 53 of the retention structure 17, 18 to the connector body 13 snap ring pliers are used to spread the terminal ends 45 of the clip body 21 away from each other until the clip body 21 is expanded to an extent such that the snap ring clip 53 may be slid over a pilot portion 30 of the connector body 13. Once the clip body 21 of the snap ring clip 53 is expanded to such an extent, the snap ring clip 53 is slid over the pilot portion 30 of the connector body 13 until the snap ring clip 53 is aligned with the one or more retention structure slot(s) 24 that it is to be engaged to. Once the snap ring clip 53 is aligned with the retention structure slot(s) 24 that it is to be engaged to, the spreading forces applied to the snap ring clip 53 by the snap ring pliers are discontinued and the snap ring clip 53 springs toward its free state and becomes properly engaged to the connector body 13 and the retention structure slot(s) 24. The process of engaging a snap ring clip 53 to a component in such a manner is well known.

Figure 2:
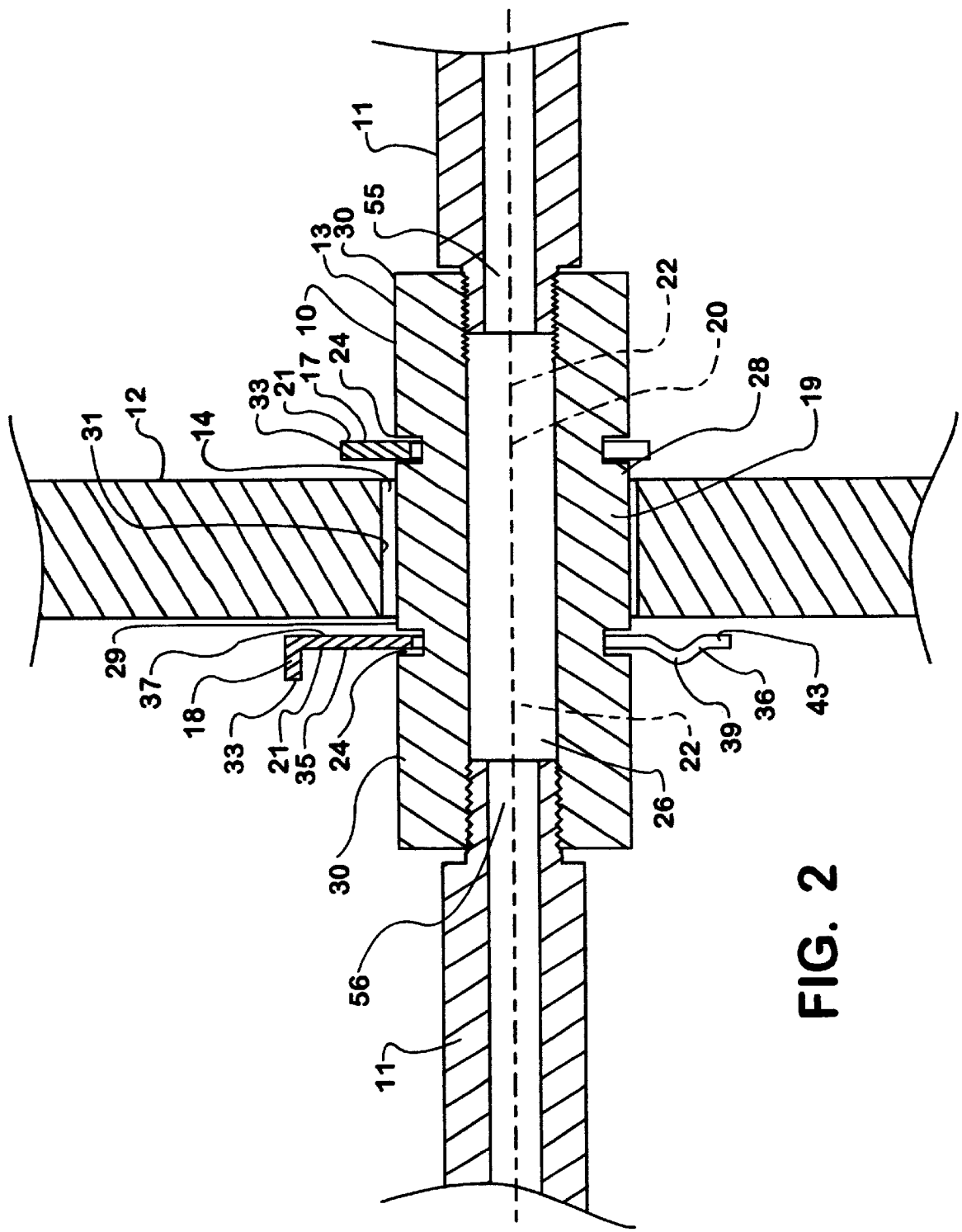
FIG. 2 is a sectional view of a connector component according to the present invention showing one possible manner in which two or more devices may be engaged to the connector component in such a manner that they are fluidly connected to one another.

The connector component 10 of the present invention may be constructed to fluidly connect two or more devices 11 that are disposed upon opposite sides of a connector mounting component 12 to which the connector component 10 is or may be mounted. For instance, the connector mounting component 12, to which the connector component 10 is or may be mounted, may be a bulkhead upon opposite sides of which two or more devices 11 that are to be fluidly connected to one another may be disposed. As was mentioned above, a connector body 13 may define a fluid communication passageway 26 that extends through the connector body 13 and is in fluid communication with and extends between a first opening 55 and second opening 56 defined in outer surfaces of the connector body 13. The construction of a connector body 13 may be such that it defines a fluid communication passageway 26 that extends through the mounting portion 19 of the connector body 13 as it extends between a first opening 55 and a second opening 56 in outer surfaces of the connector body 13. The first opening 55 and the second opening 56 in outer surfaces of such a connector body 13 would be disposed upon opposite sides of the mounting portion 19 of the connector body 13. A connector component 10 constructed in such a manner could be utilized to fluidly connect to one another devices 11 disposed upon opposite sides of a connector mounting component 12 to which the connector component 10 is mounted as is illustrated in FIG. 2.

The connector component 10 of the present invention may be constructed to electrically connect two or more devices 11 that are disposed upon opposite sides of a connector mounting component 12 to which the connector component 10 is or may be mounted. For instance, the connector mounting component 12, to which the connector component 10 is or may be mounted, may be a bulkhead upon opposite sides of which two or more devices 11 that are to be electrically connected to one another may be disposed. As was mentioned above, a connector component 10 that is constructed to electrically connect two or more devices 11 to one another comprises first electrical connection structure 57 and second electrical connection structure 58 to each of which a device 11 may be electrically connected and between which electricity conducting structure 27 extends. A connector component 10 may be constructed in such a manner that the first electrical connection structure 57 and the second electrical connection structure 58 are disposed upon opposite sides of the mounting portion 19 of the connector body 13. Such a connector component 10 may further be constructed with electricity conducting structure 27 that extends through the mounting portion 19 of the connector body 13 between the first electrical connection structure 57 and the second electrical connection structure 58. A connector component 10 constructed in such manner could be utilized to electrically connect to one another devices 11 disposed upon opposite sides of a connector mounting component 12 to which the connector component 10 is mounted as is illustrated in FIG. 13.

Figure 14:
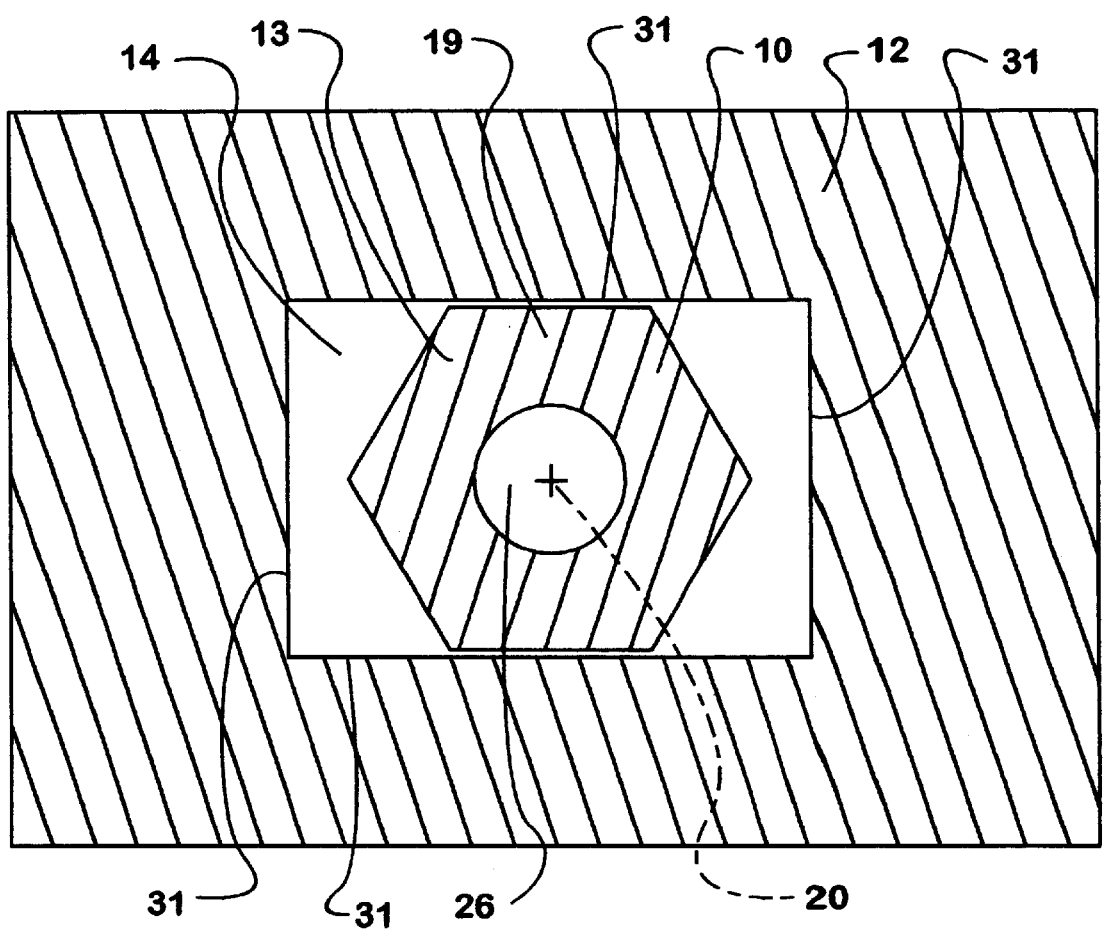
FIG. 14 is a sectional view through a mounting portion of a connector body of a connector component of the present invention that is mounted to a connector mounting component, showing a first embodiment of the connector body and the connector opening that would prevent relative rotation between the connector body and the connector mounting component about the central axis of the mounting portion.
Figure 15:
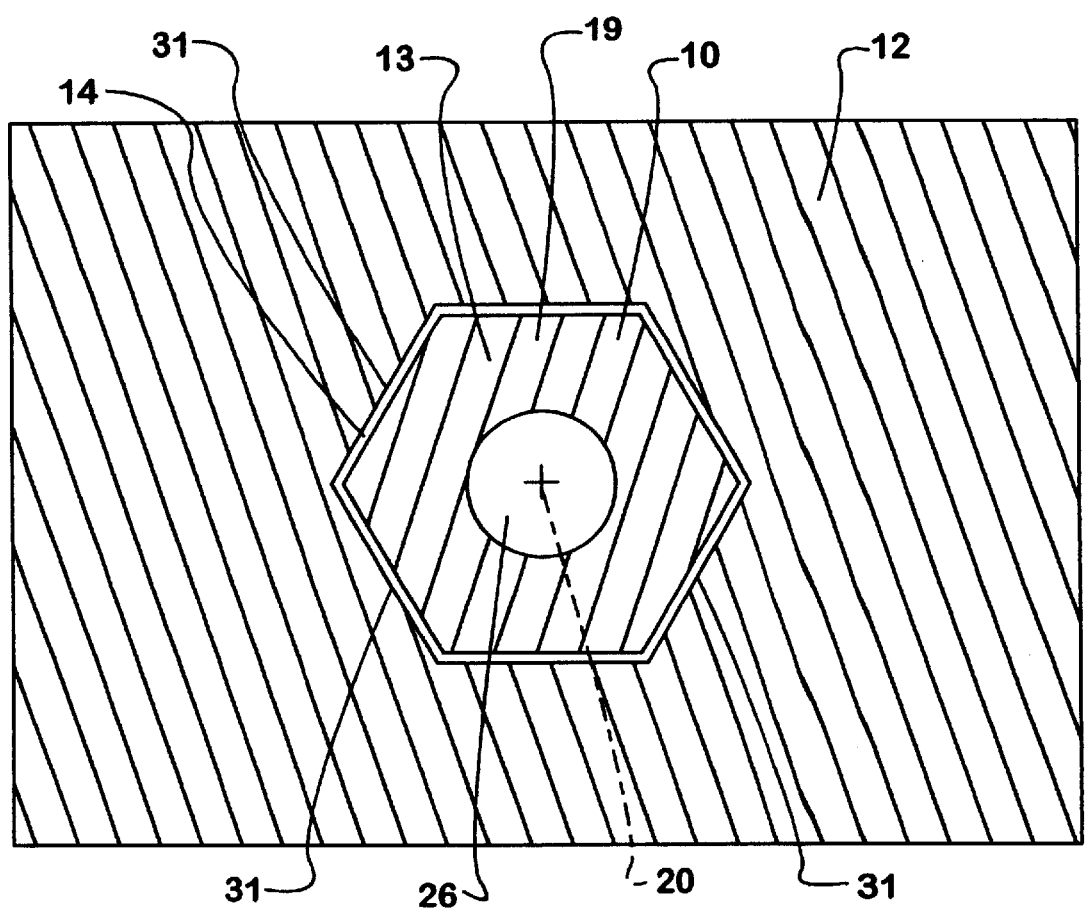
FIG. 15 is a sectional view through a mounting portion of a connector body of a connector component of the present invention that is mounted to a connector mounting component, showing a second embodiment of the connector body and the connector opening that would prevent relative rotation between the connector body and the connector mounting component about the central axis of the mounting portion.

The connector component 10 and a connector mounting component 12, to which the connector component 10 is to be mounted according to the present invention may be constructed in such a manner to prevent relative rotation between one another when the connector component 10 is properly mounted to the connector mounting component 12. The connector opening 14 defined through the connector mounting component 12 may be non-circular in shape. The mounting portion 19 of the connector body 13 may have a shape such that the outer perimeter of cross-sections of the mounting portion 19 perpendicular to its central axis 20 are also non-circular. Additionally, each non-circular outer perimeter of cross sections of such a mounting portion 19 perpendicular to its central axis 20 may have maximum widths that are greater than minimum widths of a non-circular connector opening 14 defined through a corresponding connector mounting component 12. Such a connector component 10 properly mounted to such a connector mounting component 12 is prevented from rotating substantially relative to the connector mounting component 12 about the central axis 20 of the mounting portion 19. Relative rotation between such a connector component 10 and connector mounting component 12 is prevented by abutment between outer surfaces of the mounting portion 19 and portions of the connector mounting component 12 adjacent the inner perimeter of the connector opening 14. The connector opening 14 and the mounting portion 19 may each have any non-circular shape and effect this anti-rotation feature as long as the maximum sectional width of the mounting portion 19 is greater than a minimum width of the connector opening 14. For example, as is shown in FIG. 14 the connector opening 14 defined through the connector mounting component 12 may be rectangular in shape and the connector body 13 may have a shape such that an outer perimeter of cross-sections of the mounting portion 19 perpendicular to its central axis 20 are hexagonal. As long as the maximum sectional width of such a hexagonally shaped mounting portion 19 is greater than a minimum width of such a corresponding rectangle shaped connector opening 14 the connector body 13 will be prevented from substantial rotation relative to the connector mounting component 12. As is shown in FIG. 15, the connector body 13 and the connector mounting component 12 may, alternatively be constructed in such a manner that the connector opening 14 and the outer perimeter of cross-sections of the mounting portion 19 perpendicular to its central axis 20 have essentially the same shape.

Figure 17:
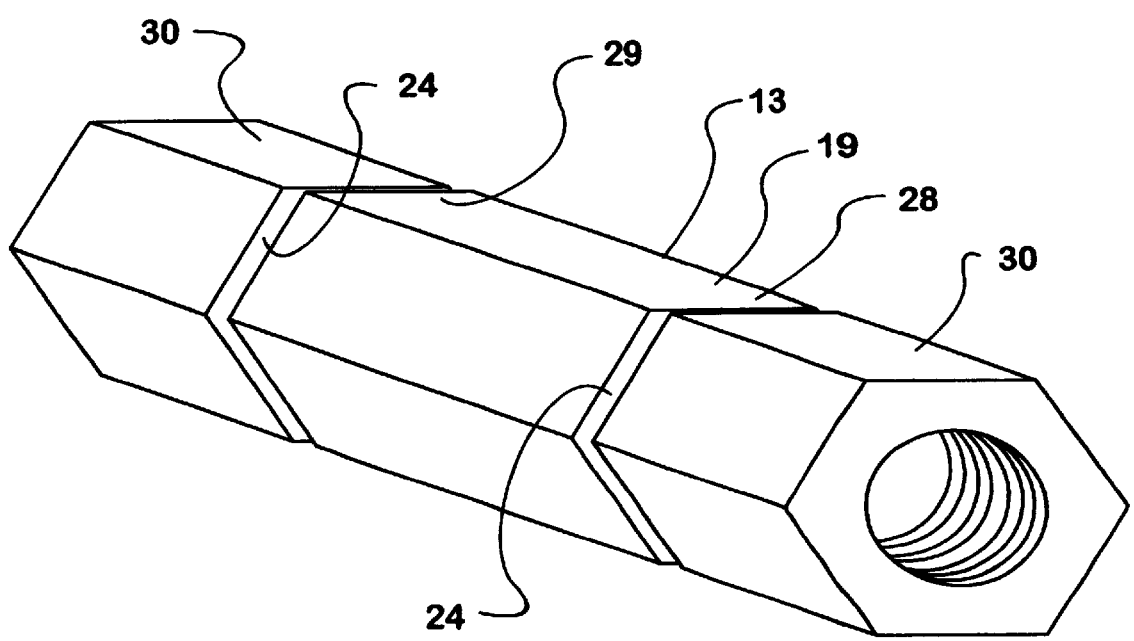
FIG. 17 is a perspective view of a connector body that is of such a construction that it could be easily constructed from a section of hexagonal bar stock.

The connector body 13 of the connector component 10 of the present invention may have any of a vast number of shapes that meet the guidelines outlined above for the construction of a connector body 13 according to the present invention. In the interest of producing a connector component 10 in a cost effective manner, the connector body 13 of the present invention may be constructed from a unitary piece of bar stock that has a constant cross-section. A connector body 13 constructed from such a piece of bar stock would have a shape such that the outer perimeter of substantially every cross-section of the connector body 13 perpendicular to the central axis 20 of the mounting portion 19 of the connector body 13 would have a same shape and size. Of course, some portions of the connector body 13, such as those portions that define retention structure slots 24 or other localized special features may have an outer perimeter that is of a shape and/or size different than the perimeters of most of the rest of the connector body 13. For exemplary purposes, a connector body 13 that is of such a shape that it could easily be constructed from a unitary piece of bar stock with a hexagonal cross-section is shown in FIG. 17.

Figure 16A:
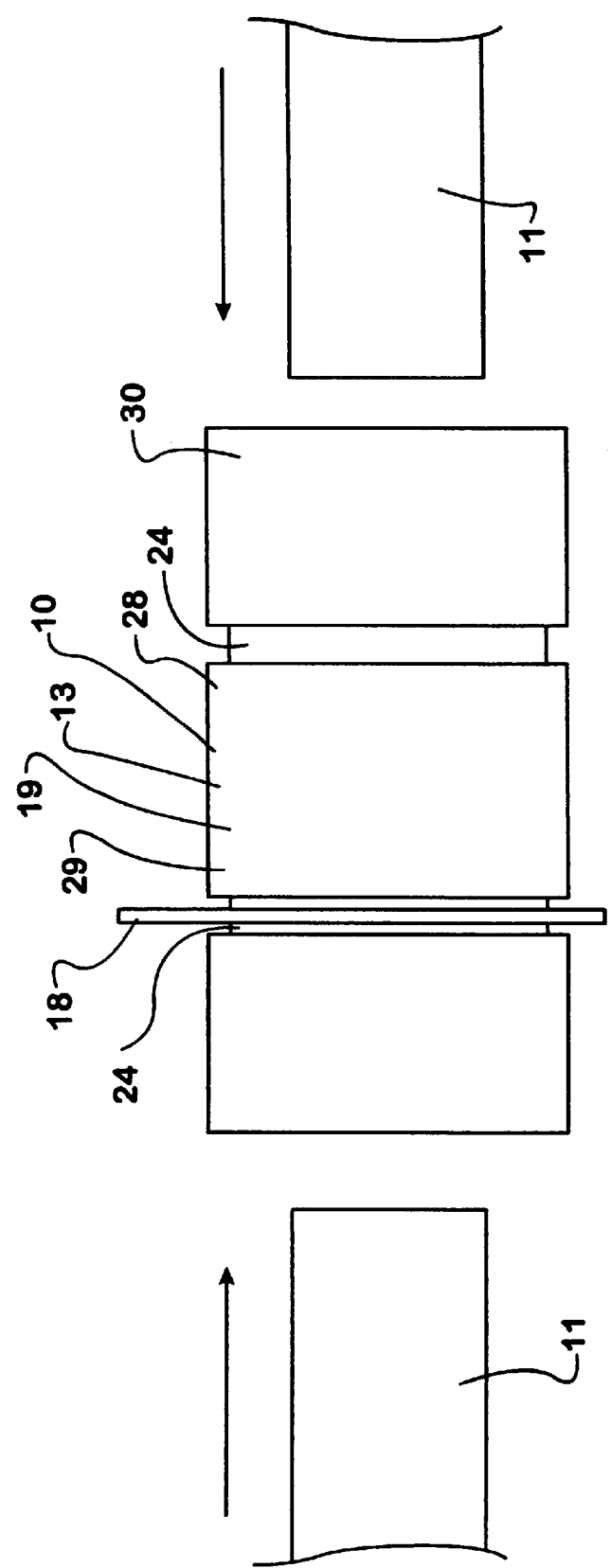
FIG. 16a is a view showing a first step in a novel assembly method of the present invention, which comprises connecting two or more devices to a connector component in such a manner that they are fluidly or electrically connected to one another.
Figure 16B:
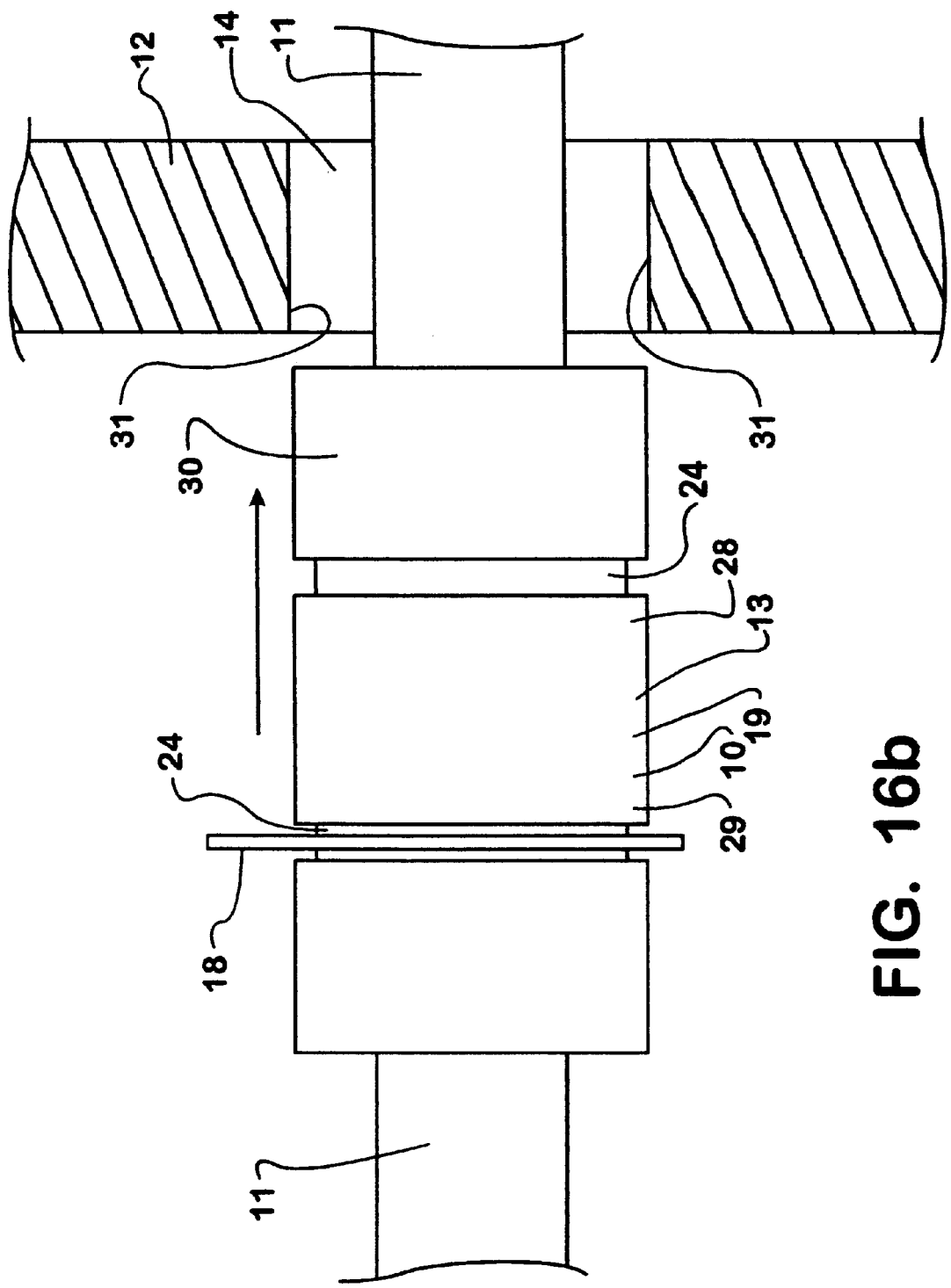
FIG. 16b is a view, partially in section, showing a second step in a novel assembly method of the present invention, which comprises inserting one or more of the devices and the connector body into a connector opening of a connector mounting component.
Figure 16C:
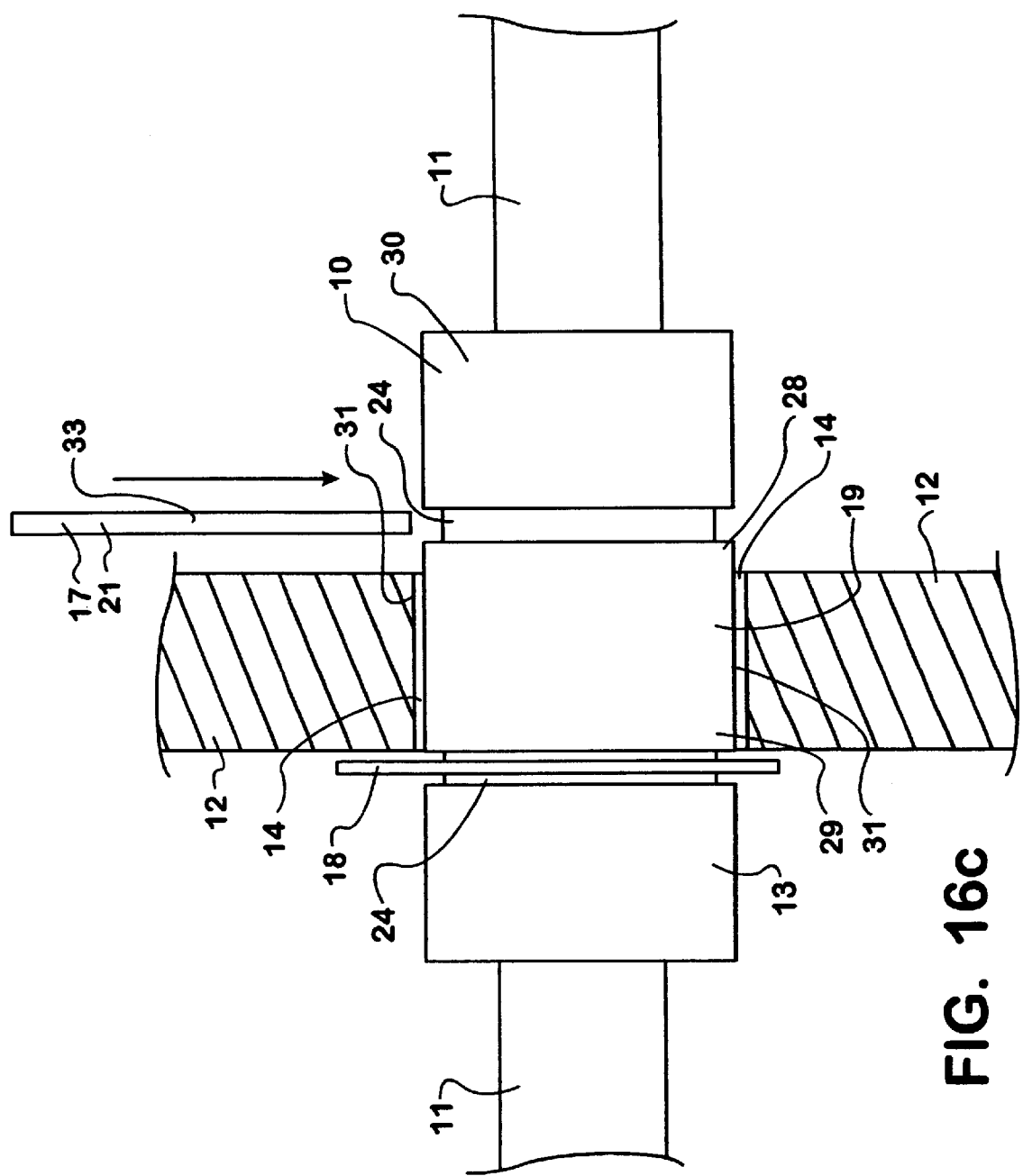
FIG. 16c is a view, partially in section, showing a third step in a novel assembly method of the present invention, which comprises engaging a quick connect clip that is retention structure of the connector component to its connector body.
Figure 16D:
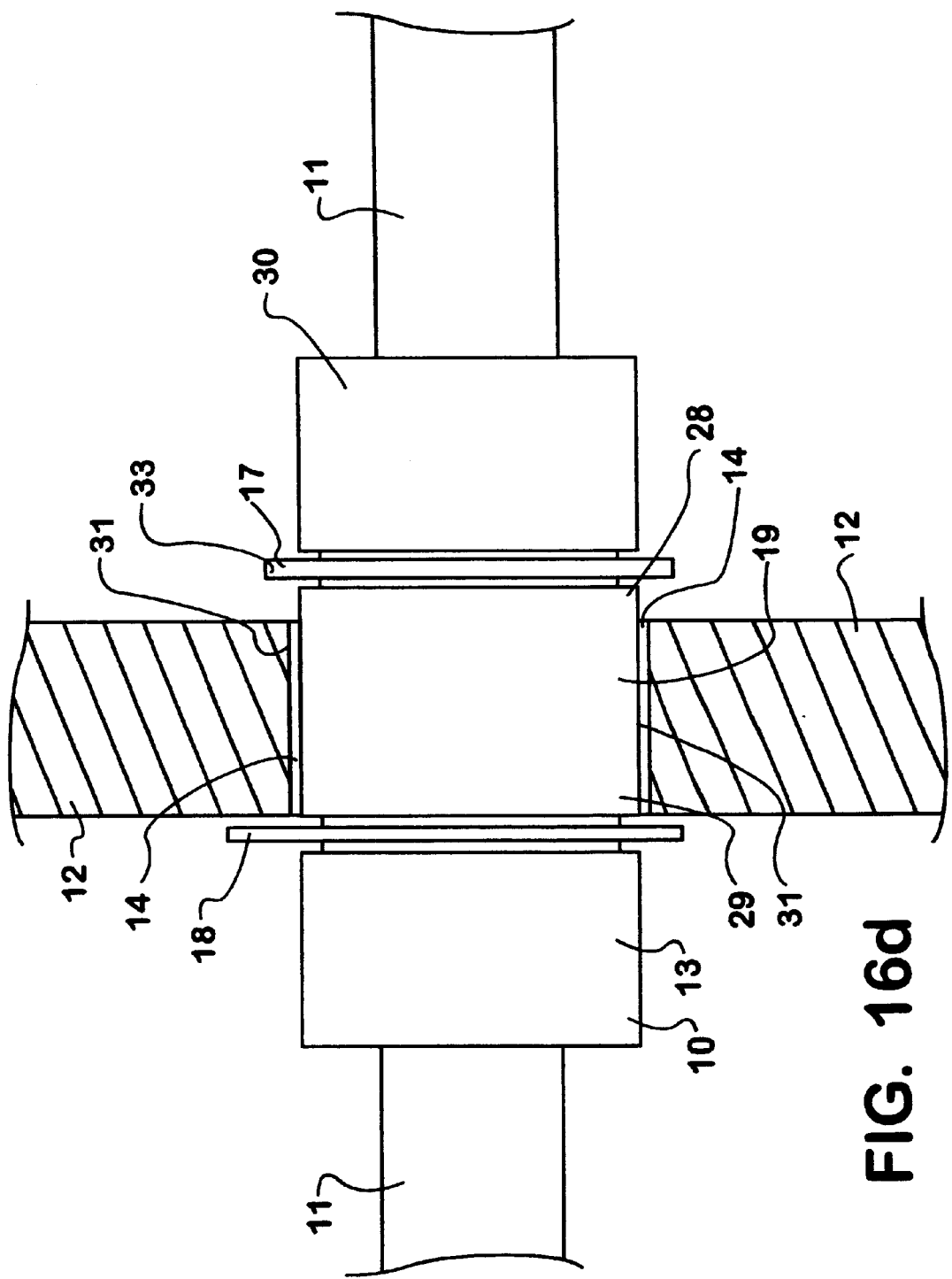
FIG. 16d is a view, partially in section, showing the results of the novel assembly method of the present invention.

The present invention further includes a novel method of assembling a connector mounting component 12, a connector component 10, and two or more devices 11 to one another. The successive steps in the novel method of assembly of the present invention are represented in FIGS. 16a, 16b, 16c, and 16d. According to this novel method of assembly of the present invention two or more devices 11 are connected to the connector component 10 upon opposite sides of its mounting portion 19 in such a manner that they are fluidly or electrically connected to one another. This step in the method of assembly of the present invention is represented in FIG. 16a. In order that the devices 11 may be disposed upon opposite sides of the mounting portion 19 and fluidly or electrically connected to one another in such a manner the connector component 10 must be of the type that has a fluid communication passageway 26 or electrical connection structure 27 that pass through its mounting portion 19. Subsequently, each of the devices 11 that are connected to the connector component 10 upon one side of its mounting portion 19 are inserted through the connector opening 14 of the connector mounting component 12. In order that this step may be accomplished, the devices 11 that are inserted through the connector opening 14 must be of such a shape and size that they will readily pass through the connector opening 14. After these devices 11 are inserted through the connector opening 14, a pilot portion 30, of the connector body 13, that is disposed upon a same side of the mounting portion 19 as the devices 11 that were inserted through the connector opening 14, is inserted through the connector opening 14. Subsequently, whichever of the ends 28, 29 of the mounting portion 19 of the connector body 13 is adjacent the previously inserted pilot portion 30 is inserted through the connector opening 14 defined in the connector mounting component 12. The mounting portion 19, of the connector body 13, is then inserted into the connector opening 14 until the first end 28 and the second end 29 of the mounting portion 19 are disposed upon opposite sides of the connector mounting component 12. Whichever of the first end 28 and the second end 29 of the mounting portion 19 is inserted through the connector opening 14 must have neither of the first retention structure 17 and the second retention structure 18 engaged to the connector body 13 adjacent it, when it is inserted through the connector opening 14. Additionally, whichever of the first end 28 and the second end 29 of the mounting portion 19 is inserted through the connector opening 14 should be an end 28 or 29 adjacent which first retention structure 17 or second retention structure 18 that is a quick connect clip 33 may be engaged. The steps of successively inserting these structures through the connector opening 14 of the connector mounting component 12 are represented in FIG. 16b. After the mounting portion 19 is properly disposed within the connector opening 14, a quick connect clip 33 that constitutes one of the retention structures 17, 18 is engaged to the connector body 13 adjacent whichever of the ends 28, 29 of the mounting portion 19 that was inserted through the connector opening 14. Once this quick connect clip 33 is engaged to the connector body 13 in such a manner, subsequent translation of the connector body 13 relative to the connector mounting component 12 in the direction opposite the direction in which the connector body 13 was inserted into the connector opening 14 is prevented. The step of engaging a quick connect clip 33 to the connector body 13 adjacent whichever of the ends 28, 29 of the mounting portion 19, that was inserted through the connector opening 14 is represented in FIG. 16c. The completed assembly resulting from the method of assembly according to the present invention is represented in FIG. 16d. During the execution of the method of assembly of the present invention, retention structure 17, 18 may or may not be engaged to the connector body 13 adjacent whichever of the ends 28, 29 of the mounting portion 19 that is not inserted through the connector opening 14. Prior to completion of the method of assembly according to the present invention, retention structure 17, 18 is to be engaged to the connector body 13 adjacent both the first end 28 and the second end 29 of the mounting portion 19 of the connector body 13. Thus, the method of assembly of the present invention may also include the step of engaging first retention structure 17 or second retention 18 to the connector body 13 adjacent whichever of the ends 28, 29 of the mounting portions 19 that is not inserted through the connector opening 14.

The connector component 10, a connector mounting component 12, and two or more devices 11 that are connected to the connector component 10 and fluidly and/or electrically connected to one another by the connector component 10 may be a part of any of an innumerable different kinds of assemblies. A vehicle 70 is one type of assembly that may include these components. A vehicle 70 generally includes one or more frames 71 that are relatively strong structural constructions to which a large percentage of other components of the vehicle 70 are engaged directly or indirectly and from which a large percentage of these other components of the vehicle 70 derive support directly or indirectly. A vehicle 70 also generally includes a suspension system 72 to which the one or more frames 71 of the vehicle 70 are engaged. The one or more frames 71 of the vehicle 70, and thus a large percentage of the other components of the vehicle 70, are supported above the ground by the suspension system 72 of the vehicle 70. The suspension system 72 of the vehicle 70 is also constructed in a manner, as it is well known to do, that causes the suspension system 72 and thus the vehicle 70 to have a relatively low resistance to translation along the ground. The suspension system 72 of the vehicle 70 may include spring/damper components engaged between the one or more frames 71 that it supports and components of the suspension system 72 that are engaged to the ground. Such a suspension system 72 helps to reduce the harshness of vertical accelerations of the frames 71 of the vehicle 70 as the vehicle 70 travels over uneven terrain. Alternatively, the suspension system 72 of a vehicle 70 may have a relatively rigid construction between points of engagement to the ground and points of engagement to the frames 71 of the vehicle 70. Such a vertically rigid suspension system 72 would provide very little isolation of one or more frames 71 of the vehicle from the irregularities of the ground as the vehicle 70 travels over uneven terrain. A vehicle 70 generally also comprises one or more body structures 73 upon or within which objects and/or individuals may reside. An operator cabin 74 of a motorized vehicle is an example of such a body structure 73. According to the present invention a connector mounting component 12, to which a connector component 10 according to the present invention is or may be mounted, may be any of a number of different components of a vehicle 70.

One use for a connector component 10 according to the present invention is for fluidly or electrically connecting to one another two or more devices 11 that are disposed upon opposite sides of a frame rail 75 of a vehicle 70. FIG. 1 illustrates such a use of a connector component 10 according to the present invention. Some vehicles 70 have frames 71 that comprise two frame rails 75 that are strong rigid members that extend parallel to one another along some portion of the length of the vehicle 70. Heavy duty trucks are an example of a type of vehicle 70 that are generally constructed with a frame 71 that comprises two frame rails 75 that extend parallel to one another along at least a portion of the length of the vehicle 70. As mentioned above, such a frame rail 75 of a vehicle 70 may be a connector mounting component 12 that defines through itself a connector opening 14 according to the present invention. A connector component 10 according to the present invention may be mounted to such a frame rail 75 with the mounting portion 19 of its connector body 13 disposed within a connector opening 14 defined through the frame rail 75. Two or more devices 11 such as tubing or electrical cables that are disposed upon opposite sides of a frame rail 75 of the vehicle 70 may be connected to the connector component 10 upon opposite sides of its mounting portion 19 in such a manner that the two or more devices 11 are fluidly or electrically connected to one another. Of course, in order that a connector component 10 may fluidly or electrically connect to one another two or more devices 11 disposed upon opposite sides of a frame rail 75, the connector component 10 must be of the type that has a fluid communication passage 26 or electricity conducting structure 27 extending through its mounting portion 19.

Those skilled in the art will appreciate that modifications could be made to the invention as described without departing from the spirit and scope of the invention and thus the scope of the invention is limited only by the following claims.

We claim:

1. A connector component for mounting to a connector mounting component, which connector mounting component defines a connector opening through itself, which connector opening has an outer perimeter, and for electrically connecting two or more devices to one another, said connector component comprising:
   (a) a connector body that comprises a mounting portion that is of a shape and size such that said mounting portion may be disposed within and protrude through the connector opening defined through the connector mounting component, when said connector component is properly mounted to the connector mounting component in such a manner that said mounting portion is disposed within the connector opening defined through the connector mounting component in such a manner that a first end of said mounting portion and a second end of said mounting portion are disposed upon opposite sides of the connector mounting component;
   (b) wherein said connector component comprises first retention structure and second retention structure that are or may be engaged to said connector body adjacent said first end and said second end respectively of said mounting portion of said connector body in such a manner that at least a portion of said first retention structure and said second retention structure extend outwardly from said connector body in directions perpendicular to a central axis of said mounting portion of said connector body;
   (c) wherein said connector body, said first retention structure, and said second retention structure are constructed in such a manner that, when said mounting portion of said connector body is disposed within the connector opening defined through the connector mounting component and said first retention structure and said second retention structure are properly engaged to said connector body, some portion of both said first retention structure and said second retention structure always extend beyond the outer perimeter of the connector opening in directions perpendicular to said central axis of said mounting portion of said connector body and, thus, said mounting portion of said connector body is retained within the connector opening;
   (d) wherein said connector body comprises one or more pilot portions each of which is disposed adjacent either said first end or said second end of said mounting portion of said connector body and each of which is of a shape and size such that it may be slid through the connector opening defined through the connector mounting component;
   (e) wherein adjacent to at least one of said first end and said second end of said mounting portion that one of said one or more pilot portions is disposed adjacent, said connector body defines one or more retention structure slots that extend inwardly of outer surfaces of said connector body and at least a portion of which extend in directions perpendicular to said central axis of said mounting portion of said connector body;
   (f) wherein at least one of said first retention structure and said second retention structure is a quick connect clip that is or may be engaged to said connector body adjacent one of said first end and said second end of said mounting portion adjacent which a pilot portion is disposed;
   (g) wherein each quick connect clip of said first retention structure and/or said second retention structure comprises a clip body that is spaced from and extends at least 180 degrees around a clip central axis of said quick connect clip;
   (h) wherein said connector body and each quick connect clip of said first retention structure and/or said second retention structure are constructed in a manner such that said each quick connect clip of said first retention structure and/or said second retention structure may be engaged to said connector body with at least some portion of an inner perimeter of its clip body disposed within one or more of said retention structure slots defined by said connector body;
   (i) wherein said connector body and each quick connect clip of said first retention structure and said second retention structure are constructed in such a manner that, when each quick connect clip is properly engaged to said connector body, said quick connect clip must be elastically deformed before it can be disengaged from said connector body;
   (j) wherein said connector body and each quick connect clip of said first retention structure and said second retention structure are of a construction such that each quick connect clip may be quickly and easily slid or snapped into or out of engagement with a portion of said connector body adjacent either said first end or said second end of said mounting portion; and
   (k) wherein said connector component comprises first electrical connection structure, second electrical connection structure and electricity conducting structure that is electrically connected to and extends between said first electrical connection structure and said second electrical connection structure.

2. The connector component of claim 1, wherein:
   (a) said connector component comprises first electrical connection structure and second electrical connection structure that are disposed upon opposite sides of said mounting portion of said connector body and between which electricity conducting structure extends through said mounting portion of said connector body.

3. The connector component of claim 2, wherein:
   (a) said mounting portion of said connector body is of such a shape that outer perimeters of cross-sections of said mounting portion that are perpendicular to said central axis of said mounting portion are non-circular in shape.

4. The connector component of claim 3, wherein:
(a) said connector body comprises a first pilot portion that is disposed adjacent said first end of said mounting portion of said connector body and which is of a shape and size such that it may be slid through the connector opening defined through the connector mounting component;
(b) said connector body comprises a second pilot portion that is disposed adjacent said second end of said mounting portion of said connector body and which is of a shape and size such that it may be slid through the connector opening defined through the connector mounting component; and
(c) both said first retention structure and said second retention structure are quick connect clips.

5. The connector component of claim 4, wherein:
(a) said connector body defines a first retention structure slot between said first end of said mounting portion and said first pilot portion of said connector body;
(b) said connector body defines a second retention structure slot between said second end of said mounting portion and said second pilot portion of said connector body; and
(c) each of said first retention structure slot and said second retention structure slot extends inwardly of outer surfaces of said connector body and also in an unbroken manner in directions perpendicular to said central axis of said mounting portion around a circumference of said connector body.

6. The connector component of claim 5, wherein:
(a) said connector body of said connector component is constructed in such a manner that an outer perimeter of substantially every cross-section of said connector body perpendicular to said central axis of said mounting portion of said connector body has a same shape and size except for cross-sections that include special localized features such as retention structure slots.

7. The connector component of claim 6, wherein:
(a) each of said quick connect clips of said first retention structure and said second retention structure is an E-clip.

8. The connector component of claim 6, wherein:
(a) each of said quick connect clips of said first retention structure and said second retention structure is a snap ring clip.

9. The connector component of claim 6, wherein:
(a) each of said quick connect clips of said first retention structure and said second retention structure is a lock retention clip.

10. The connector component of claim 1, wherein:
(a) each quick connect clip of said first retention structure and/or said second retention structure is a lock retention clip.

11. The connector component of claim 1, wherein:
(a) each quick connect clip of said first retention structure and/or said second retention structure is an E-clip.

12. The connector component of claim 1, wherein:
(a) each quick connect clip of said first retention structure and/or said second retention structure is a snap ring clip.

13. A method of connecting two or more devices that are to be electrically connected to one another to a connector component in such a manner that the two or more devices are electrically connected to one another by the connector component and mounting the connector component to a connector mounting component, said method comprising the sequential execution of the steps of:
(a) connecting two or more of said devices, that are to be electrically connected to one another, to a connector component upon opposite sides of a mounting portion of a connector body of said connector component in such a manner that said two or more devices are electrically connected to one another by electricity conducting structure that extends through said mounting portion;
(b) inserting all of said devices that are connected to said connector component upon one side of said mounting portion of said connector body through a connector opening defined by said connector mounting component;
(c) inserting through said connector opening a pilot portion of said connector body that is disposed upon a same side of said mounting portion as said devices that were inserted through said connector opening;
(d) inserting through said connector opening an end of said mounting portion adjacent said pilot portion that was inserted through said connector opening and adjacent which neither of a first retention structure and a second retention structure is engaged to said connector body;
(e) inserting said mounting portion of said connector body into said connector opening until opposite ends of said mounting portion of said connector body are disposed upon opposite sides of said connector mounting component; and
(f) engaging a quick connect clip that constitutes either said first retention structure or said second retention structure to a portion of said connector body adjacent said end of said mounting portion that was inserted through said connector opening.

14. The method of claim 13, wherein:
(a) said connector body of said connector component defines one or more retention structure slots adjacent said end of said mounting portion of said connector body that is inserted through said connector opening;
(b) said one or more retention structure slots defined by said connector body extend inwardly from outer surfaces of said connector body and at least a portion of said one or more retention structure slots extends in directions perpendicular to a central axis of said mounting portion of said connector body;
(c) said connector body and said quick connect clip are constructed in such a manner that, during said step of engaging said quick connect clip to said connector body, said quick connect clip may be and is engaged to said connector body in such a manner that at least a portion of an inner perimeter of a clip body of said quick connect clip is disposed within at least a portion of said one or more retention structure slots defined by said connector body adjacent said end of said mounting portion that was inserted through said connector opening; and
(d) said connector body and said quick connect clip that is engaged to said connector body are of such a construction that said quick connect clip must be elastically deformed during said step of engaging said quick connect clip to said connector body and, after said quick connect clip is engaged to said connector body, said quick connect clip must be elastically deformed if said quick connect clip is to be disengaged from said connector body.

15. The method of claim 14, wherein:
(a) said quick connect clip that is engaged to said portion of said connector body adjacent said end of said mounting portion that is inserted through said connector opening is a lock retention clip.

16. The method of claim 14, wherein:
(a) said quick connect clip that is engaged to said portion of said connector body adjacent said end of said mounting portion that is inserted through said connector opening is an E-clip.

17. The method of claim 14, wherein:
(a) said quick connect clip that is engaged to said connector body adjacent said end of said mounting portion that is inserted through said connector opening is a snap ring clip.

18. A vehicle, comprising:
(a) one or more frames;
(b) a suspension system to which said one or more frames are engaged and by which said one or more frames are supported above the ground and which provides said vehicle with a relatively low resistance to translation along the ground;
(c) one or more body structures that are engaged to and supported by one or more of said one or more frames and upon or within which objects and/or individuals may reside;
(d) a connector mounting component that defines a connector opening through itself;
(e) a connector component that is mounted to said connector mounting component;
(f) wherein said connector component comprises a connector body that comprises a mounting portion that is disposed within and protrudes through said connector opening defined through said connector mounting component in such a manner that a first end and a second end of said mounting portion are disposed upon opposite sides of said connector mounting component;
(g) wherein said connector component comprises first retention structure and second retention structure that are engaged to said connector body adjacent said first end and said second end respectively of said mounting portion of said connector body in such a manner that at least a portion of said first retention structure and said second retention structure extend outwardly from adjacent portions of said connector body in directions perpendicular to a central axis of said mounting portion of said connector body;
(h) wherein said connector body, said first retention structure, and said second retention structure are constructed in such a manner that, regardless of any shifting of said connector body within said connector opening, some portion of each of said first retention structure and said second retention structure always extends beyond an outer perimeter of said connector opening in directions perpendicular to said central axis of said mounting portion of said connector body and, thus, said mounting portion of said connector body is retained within said connector opening;
(i) wherein said connector body comprises one or more pilot portions each of which is disposed adjacent either said first end or said second end of said mounting portion of said connector body and each of which is of a shape and size such that it may be slid through said connector opening defined through said connector mounting component;
(j) wherein adjacent to at least one of said first end and said second end of said mounting portion that one of said one or more pilot portions is disposed adjacent, said connector body defines one or more retention structure slots that extend inwardly of outer surfaces of said connector body and at least a portion of which extend in directions perpendicular to said central axis of said mounting portion of said connector body;
(k) wherein at least one of said first retention structure and said second retention structure is a quick connect clip that is engaged to said connector body adjacent one of said first end and said second end of said mounting portion that is adjacent one of said pilot portions;
(l) wherein each quick connect clip of said first retention structure and/or said second retention structure comprises a clip body that is spaced from and extends at least 180 degrees around a clip central axis of said quick connect clip;
(m) wherein said connector body and each of said quick connect clip of said first retention structure and/or said second retention structure are constructed in a manner such that said each quick connect clip of said first retention structure and/or said second retention structure may be and is engaged to said connector body with at least some portion of an inner perimeter of its clip body disposed within one or more of said retention structure slots defined by said connector body;
(n) wherein said connector body and each quick connect clip of said first retention structure and said second retention structure are constructed in such a manner that, each quick connect clip must be elastically deformed before it can be disengaged from said connector body;
(o) wherein said connector body and each of said quick connect clip of said first retention structure and said second retention structure are of a construction such that said each quick connect clip may be repeatedly quickly and easily slid or snapped into or out of engagement with a portion of said connector body adjacent either said first end or said second end of said connector body of said connector component; and
(p) wherein said connector component comprises first electrical connection structure, second electrical connection structure and electricity conducting structure that is electrically connected to and extends between said first electrical connection structure and said second electrical connection structure, and said vehicle comprises two or more devices that are electrically connected to one another through said electricity conducting structure that extends between said first electrical connection structure and said second electrical connection structure.

19. The vehicle of claim 18, wherein:
(a) said connector component comprises first electrical connection structure and second electrical connection structure that are disposed upon opposite sides of said mounting portion of said connector body and between which electricity conducting structure extends through said mounting portion of said connector body.

20. The vehicle of claim 19, wherein:
(a) said one or more frames of said vehicle comprise a frame rail which is said connector mounting component that defines said connector opening through which said mounting portion of said connector body of said connector component protrudes.

21. The vehicle of claim 19, wherein:
(a) said mounting portion of said connector body is of such a shape that outer perimeters of cross-sections of said mounting portion that are perpendicular to said central axis of said mounting portion are non-circular in shape;
(b) said connector opening defined through said connector mounting component is also non-circular in shape; and
(c) said connector body of said connector mounting component is of such a construction that a maximum sectional width of said mounting portion of said connector body is greater than a minimum width across said connector opening defined through said connector mounting component and, thus, said connector component is prevented from rotating substantially relative to said connector mounting component about said central axis of said mounting portion of said connector body.

22. The vehicle of claim 21, wherein:
(a) said connector body defines a first pilot portion that is disposed adjacent said first end of said mounting portion of said connector body and which is of a shape and size such that it could be slid through said connector opening defined through said connector mounting component;
(b) said connector body defines a second pilot portion that is disposed adjacent said second end of said mounting portion of said connector body and which is of a shape and size such that it could be slid through said connector opening defined through said connector mounting component; and
(c) both said first retention structure and said second retention structure are quick connect clips.

23. The vehicle of claim 22, wherein:
(a) said connector body defines a first retention structure slot between said first end of said mounting portion and said first pilot portion of said connector body;
(b) said connector body defines a second retention structure slot between said second end of said mounting portion and said second pilot portion of said connector body; and
(c) each of said first retention structure slot and said second retention structure slot extends inwardly of outer surfaces of said connector body and also in an unbroken manner in directions perpendicular to said central axis of said mounting portion around a circumference of said connector body.

24. The vehicle of claim 23, wherein:
(a) said connector body of said connector component is constructed in such a manner that an outer perimeter of substantially every cross-section of said connector body perpendicular to said central axis of said mounting portion of said connector body has a same shape and size except for cross-sections that include special localized features such as retention structure slots.

25. The vehicle of claim 24, wherein:
(a) each of said quick connect clips of said first retention structure and said second retention structure is an E-clip.

26. The vehicle of claim 24, wherein:
(a) each of said quick connect clips of said first retention structure and said second retention structure is a snap ring clip.

27. The vehicle of claim 24, wherein:
(a) each of said quick connect clips of said first retention structure and said second retention structure is a lock retention clip.

28. The vehicle of claim 18, wherein:
(a) each quick connect clip of said first retention structure and/or said second retention structure is a lock retention clip.

29. The vehicle of claim 18, wherein:
(a) each quick connect clip of said first retention structure and/or said second retention structure is an E-clip.

30. The vehicle of claim 18, wherein:
(a) each quick connect clip of said first retention structure and/or said second retention structure is a snap ring clip.

* * * * *